United States Patent [19]

Springer et al.

[11] Patent Number: 5,440,772
[45] Date of Patent: Aug. 15, 1995

[54] VEHICLE-ACTIVATED SAFETY LEG CONTROL SYSTEM FOR A DOCK LEVELER ASSEMBLY

[75] Inventors: Scott L. Springer, Milwaukee; Norbert Hahn, Franklin; Michael A. Swessel, Cudahy, all of Wis.

[73] Assignee: Rite-Hite Corporation, Milwaukee, Wis.

[21] Appl. No.: 96,775

[22] Filed: Jul. 23, 1993

[51] Int. Cl.⁶ ............................................. E01D 15/127
[52] U.S. Cl. ....................................... 14/69.5; 14/71.1; 14/71.3
[58] Field of Search ........................ 14/69.5, 71.1, 71.3

[56] References Cited

U.S. PATENT DOCUMENTS

| | | | |
|---|---|---|---|
| 3,061,855 | 11/1962 | Layne | 14/71.3 |
| 3,081,470 | 3/1963 | Feeley | 14/71.3 |
| 3,137,017 | 6/1964 | Pfleger et al. | 14/71.3 |
| 3,138,812 | 6/1964 | Prosser | 14/71.3 |
| 3,175,238 | 3/1965 | Pennington | 14/71.3 |
| 3,235,896 | 2/1966 | Riggs . | |
| 3,299,456 | 1/1967 | Dieter et al. | 14/71.3 |
| 3,308,497 | 3/1967 | Lambert | 14/71.3 |
| 3,368,229 | 2/1968 | Pfleger | 14/71.3 |
| 3,475,778 | 11/1969 | Merrick et al. | 14/71.3 |
| 3,530,488 | 9/1970 | Beckwith | 14/71.3 |
| 3,728,753 | 4/1973 | Beckwith et al. | 14/71.3 |
| 3,786,530 | 1/1974 | Le Clear | 14/71.3 |
| 3,835,497 | 9/1974 | Smith | 14/71.3 |
| 3,858,264 | 1/1975 | Kuhns et al. | 14/71 |
| 3,877,102 | 4/1975 | Artzberger | 14/71 |
| 3,902,213 | 9/1975 | Pfleger et al. | 14/71 |
| 3,921,241 | 11/1975 | Smith | 14/71.3 |
| 3,995,342 | 12/1976 | Wiener | 14/71.3 |
| 4,279,050 | 7/1981 | Abbott | 14/71.3 |
| 4,328,602 | 5/1982 | Bennett | 14/71.3 |
| 4,619,008 | 10/1986 | Kovach et al. | 14/71.7 |
| 4,974,276 | 12/1990 | Alexander | 14/71.3 |

FOREIGN PATENT DOCUMENTS 657714 2/1963 Canada .
2615177 11/1988 France .

Primary Examiner—David J. Bagnell
Assistant Examiner—Pamela A. O'Connor
Attorney, Agent, or Firm—Leydig, Voit & Mayer, Ltd.

[57] ABSTRACT

A vehicle-activated support assembly control system is provided which comprises a sensor assembly which senses the position of the vehicle relative to the dock leveler and an actuation assembly which is operatively connected to the support assembly so as to actuate or maintain the support assembly in a retracted position in response to the position of the vehicle. The actuation assembly is adapted to automatically position the support assembly between (1) a retracted or non-supporting position when the vehicle is in close proximity to the loading dock and (2) an active supporting position when the vehicle is greater than a predetermined distance from the loading dock. The control assembly is adapted to activate the support assembly and move the support assembly to the active supporting position as the vehicle pulls away from the dock leveler but before the lip loses contact with the vehicle. The control system deactivates the support assembly when the lip is safely supported on the vehicle bed or is within a predetermined distance in which the lip is capable of engaging the vehicle bed. The control system permits the support assembly to be in the active supporting position when the lip is extended but not safely supported by the vehicle bed.

47 Claims, 14 Drawing Sheets

VEHICLE-ACTIVATED SAFETY LEG CONTROL SYSTEM FOR A DOCK LEVELER ASSEMBLY

FIELD OF THE INVENTION

The present invention relates generally to dock levelers and more particularly to dock levelers having safety leg control devices.

BACKGROUND OF THE INVENTION

Dock levelers are utilized to compensate for height differences between the dock platform and the bed of a parked vehicle to permit forklift trucks and personnel to readily move on and off the vehicle during loading and unloading operations. A typical dock leveler has a dockboard or deck pivotally hinged at its back edge for varying the height of the dock leveler in order to compensate for the height differences. An extension plate or lip is typically hinged to the front edge of the deck for spanning the distance between the rear end of the vehicle bed and the outer front edge of the deck. The lip is adapted to move relative to the deck front edge between a pendant stored position, an extended preparatory position, and a lowered operative position. In its operative position, the lip extends from the deck front edge and may be substantially coplanar with the upper surface of the deck. The lip rests upon and is supported by the upper surface of the bed of the parked vehicle. Thus, the extended lip spans the gap which is formed between the rear edge of the vehicle bed and the front edge of the deck.

To move the lip from the pendant stored position to an extended operative position, the deck is normally pivoted upwardly a sufficient amount whereby the lip can swing outwardly to the extended preparatory position without obstruction from the parked vehicle. Once the lip has cleared the parked vehicle, the deck and extended lip are pivoted downwardly as a unit until the extended lip rests upon the vehicle bed in the operative position. After loading or unloading of the parked vehicle has been completed, the vehicle is moved away from the dock permitting the lip to be cycled to assume its pendant stored position.

The dock leveler may also include a safety support system which limits the vertical fall that would occur in the event that the vehicle would prematurely depart the loading dock while a material handling vehicle or other load is present on the dock leveler. Typical safety support systems are hydraulically activated or mechanically actuated.

Hydraulically activated dock levelers are typically equipped with a flow sensing device that closes if and when a predetermined fluid flow rate or cylinder piston velocity is achieved. Such devices allow for normal free floating of the dock leveler to accommodate the vertical height of the vehicle bed, but will lock upon the rapid acceleration that occurs after the vehicle departs the loading dock while a significant weight is present on the dock leveler deck.

Hydraulic safety systems have a disadvantage since they are designed to prevent activation of the safety support system until after the vehicle has completely separated from the dock leveler. Similarly, some previous mechanical systems do not work until after the lip disengages the bed.

Mechanically actuated dock levelers typically have a safety leg assembly which limits the vertical fall that may occur due to the premature departure of the vehicle/trailer and which supports the deck in a horizontal cross traffic position. The safety leg assembly typically has a plurality of legs pivotally mounted to the deck for movement between (1) an active supporting position in which the legs support the deck, and (2) a retracted, inactive, or non-supporting position in which the leg is relatively parallel to the deck. The legs are typically pivoted from the supporting position to the non-supporting position in response to a pull chain mounted on the deck to allow the leveler to service below-dock level vehicles. The legs are typically spring-loaded so that they return to the supporting position upon release of the chain, although some mechanical safety leg systems retain the legs in the non-supporting position whenever the lip is in the extended position.

These mechanical safety leg systems have a certain shortcoming. If the vehicle prematurely departs from the loading dock while a load, such as a forklift or cargo, remains on the deck, the safety legs may not be able to react quickly enough to move to their pendant and active supporting position in time to prevent the rapid descent of the deck to the floor of the pit, causing the load on the deck to spill onto the driveway or potential injury to dock personnel.

Completely manually operated safety legs have a different shortcoming, referred to as "stomp-out" which is caused by the uncontrolled premature obstruction of safety legs when the initial height of the vehicle bed is slightly above the height at which the safety legs engage their stops. When a relatively heavy forklift or other material handling vehicle drives onto the vehicle bed, the height of the vehicle bed is lowered so that the lip follows the descending vehicle bed, forming a relatively large angle between the lip and the deck and making it difficult or impossible for the material handling vehicle to exit the vehicle. The safety legs engage the stops and prevent the deck from descending and maintaining the desired substantially planar orientation with the lip.

Another shortcoming is the safety legs must be manually positioned to a non-supporting position when servicing below-dock level vehicles. Attempts to provide a leg which would automatically assume the retracted or non-supporting position without conscious action by the dock personnel have not been fully satisfactory because the devices resulted in unsafe premature retraction of the legs or have been highly susceptible to malfunction or are difficult and awkward to install and maintain in proper working order. One such attempt is described in U.S. Pat. No. 3,995,342 which issued to Thomas J. Weiner on Dec. 7, 1976. The legs are coupled to the lip so that the legs automatically pivot from the supporting position to the non-supporting position in conjunction with upward movement of the lip from the pendant position toward the extended position. After the lip is extended, the legs can only move to the active supporting position after the lip engages the vehicle bed. If the dock leveler is activated in the absence of a vehicle, the legs will remain in the inactive and non-supporting position, unable to prevent the rapid descent of the dock leveler upon the application of a load on the dock leveler. When the safety legs are in the non-supporting position and the lip is supported by the vehicle bed, they may not be able to react quickly enough to move to their supporting position in time to prevent the rapid descent of the deck to the pit floor if the vehicle prematurely departs from the loading dock while a load, such as a forklift truck or cargo, remains on the deck.

Various safety structures have been proposed in the past which would be responsive to rapid descent of the deck to catch the deck and prevent the descent. Such safety structures, for the most part, are complicated mechanisms and were actuated only after the lip lost contact with the vehicle bed and the deck began to fall, and thus were not entirely effective in restraining the rapid descent of the deck.

OBJECTS AND SUMMARY OF THE INVENTION

It is an object of the present invention to provide a safety leg control assembly which minimizes the aforementioned shortcomings.

It is an object of the present invention to provide a safety leg control system that maintains the safety legs in the active supporting position until a vehicle is within close proximity to the loading dock.

It is an object of the present invention to provide a safety leg control assembly that maintains the safety legs in the pendant and active supporting position until after the lip engages the vehicle bed.

A related object is to provide a safety leg control assembly which automatically positions the legs to the retracted or non-supporting position after the lip engages the vehicle bed.

It is an object of the invention to provide an improved safety leg control assembly which does not rely on a conscious act on the part of an operator to cause the leg to assume a retracted or non-supporting position if a vehicle is in close proximity and requires conscious action if the vehicle is not in close proximity to the dock.

It is another object of the invention to provide a safety leg control assembly which limits the vertical fall of the dock leveler if the vehicle supporting the dock leveler should prematurely depart.

It is a related object of the invention to provide a safety leg control assembly having a sensor assembly which senses the position of the vehicle relative to the loading dock. A more specific object of the invention is to provide a sensor assembly capable of sensing the position of the vehicle bed relative to the lip. Another specific object of the invention is to provide a sensor assembly capable of sensing the position of the rear frame structure of the vehicle.

It is a further object of the invention to provide a device which is of simple, sturdy and compact construction and is easy and inexpensive to install and maintain.

It is a further object of the invention to provide a vehicle-activated safety leg control assembly which may readily be installed on existing dock levelers which vary over a wide range in size and shape.

Another object of the invention is to provide a safety leg control system which minimizes the free fall distance of the deck upon departure of the vehicle.

A related object is to provide a safety leg control system which provides numerous stop positions with the engagement depending on the deck position relative to dock level.

In accordance with one embodiment of the invention, a vehicle-activated safety leg control system is provided. The vehicle-activated safety leg control assembly comprises a sensor assembly which senses the position of the vehicle relative to the dock leveler and an actuation assembly which is operatively connected to the sensor assembly and the safety legs so as to actuate or maintain the legs in a retracted and non-supporting position in response to the position of the vehicle relative to the extended lip. The leg control assembly is adapted to automatically position the legs between (1) a retracted, inactive or non-supporting position when the vehicle is in close proximity to the loading dock and (2) a pendant, active, or supporting position when the vehicle is greater than a predetermined distance from the loading dock. The control assembly is adapted to activate the legs and move the legs to the pendant and active supporting position as the vehicle pulls away from the dock leveler but before the lip loses contact with the vehicle. The control system only deactivates the safety legs when the lip is safely supported on the vehicle bed and permits the legs to be in the active supporting position when the lip is extended but not safely supported by the vehicle bed.

In one embodiment of the vehicle-activated safety leg control assembly, the sensor assembly senses the presence and position of the vehicle bed. The sensor assembly comprises one or more sensors which are pivotally mounted under the lip and operably connected to the safety legs. The sensor bars are adapted (1) to engage the vehicle bed when the lip rests upon the vehicle bed and (2) to pivot between (a) a fully extended position and (b) a free, downwardly hanging position. Downward pivotal movement of the sensor from the extended position will effect movement of the safety legs to the upright supporting position. Each sensor has a shorter length than the lip so that the distal end of the sensor terminates a short distance from the distal end of the lip.

During the loading operation, both the lip and the sensors will rest on the vehicle bed. In the event the vehicle pulls away from the loading dock, the shorter sensors will pivot downwardly before the lip loses contact with the vehicle bed. Downward pivotal movement of the sensors actuates the safety legs to the supporting position. The safety leg control system positions the legs in the supporting position before the lip loses contact with the vehicle bed so as to restrain the descent of the deck and prevent damage to the dockboard as well as any cargo thereon.

In a second embodiment of the vehicle-activated safety leg control system, the sensor assembly comprises a sensor plate which senses the presence of the rear frame of the vehicle. The control system deactivates the safety legs to the non-supporting position when the vehicle is positioned within a predetermined distance from the dock bumpers and activates the legs to the supporting position when the vehicle is positioned greater than the predetermined distance from the dock bumpers. The predetermined distance between the vehicle and the dock bumpers is selected so that the extended lip is in sufficient contact with the vehicle bed to support the deck and prevent the vertical fall of the deck. Similarly, the predetermined distance between the vehicle and the lip is selected so that the legs are in the active supporting position prior to the lip losing contact with the vehicle bed.

The sensor assembly comprises a sensor plate which is adapted to engage and be activated by the rear frame portion of the incoming vehicle. The sensor plate is pivotally mounted for movement between (1) a deactivated or extended position in response to the absence of the vehicle V from the control range of the plate in front of the loading dock and (2) an activated or compressed position wherein the sensor plate is pivoted towards the loading dock in response to the inward movement of the vehicle towards the loading dock. The safety legs are in the active supporting position when the sensor plate is in its extended position. Conversely, the safely legs are in the retracted and inactive position when the sensor plate is in its compressed position and the vehicle is within the predetermined distance from the lip.

In a third embodiment of the vehicle-activated safety leg control assembly, the leg control system comprises a stop assembly which can be provided with numerous stop positions allowing the deck to be stopped with minimal free-fall descent, minimizing the acceleration and impact on the components, materials and personnel. The stop assembly comprises an indexed cam having a plurality of stops adapted for receiving the safety leg. The cam may be pivotally mounted to the floor of the dock leveler or the underside of the deck for movement between lowered and raised positions in response to the position of an actuation bar which operatively connects the sensor assembly and the cam. The movement of the actuation bar, in response to the presence of the vehicle, positions the cam to the lowered position wherein the cam is adapted to support the deck at the full below-dock level position. As the vehicle departs the loading dock, the actuation bar extends outwardly so that the cam pivots to the raised position to support the deck at various positions up to dock level.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
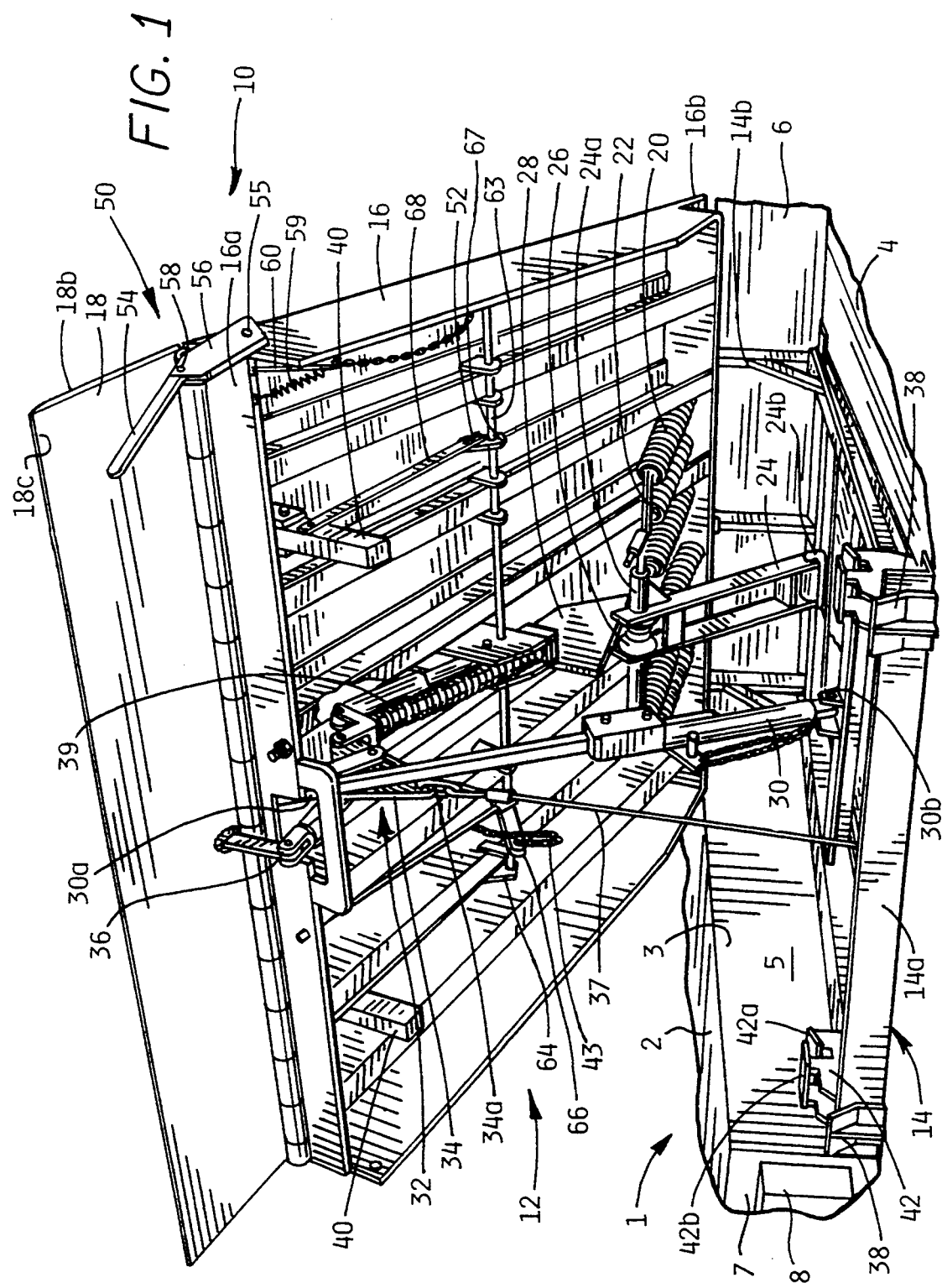
FIG. 1 is a perspective view of a dock leveler and one embodiment of a vehicle-activated safety leg control assembly in accordance with the invention.

Referring to the drawings and more particularly to FIG. 1, a safety leg control assembly 10 in accordance with the present invention is shown mounted in a dock leveler assembly 12 and a conventional loading dock 1.

Referring to FIGS. 1–6, the conventional loading dock 1 has a loading surface 2 and a recess or pit 3 defined by a floor 4 and upstanding side and rear walls 5 and 6, respectively. Mounted on the dock front wall 7 and adjacent to, but spaced from, the pit side walls 5 are conventional bumpers 8 which are engaged by the rear of the vehicle V when the vehicle V is backed into a parked position relative to the dock leveler assembly 12. The bumpers 8 prevent the vehicle V from striking and damaging the dock wall 7 and the various components of the dock leveler assembly 12.

The dock leveler assembly 12 is adapted to span the distance between the dock 1 and the bed B of the vehicle V. The dock leveler assembly 12 includes a frame 14 having a floor section 14a mounted to the floor 4 of the recess 3 and a rear section 14b projecting upwardly from the rear of the floor section 14a. A ramp or deck 16 is pivotally hinged to the rear section 14b so that the deck 16 can pivot between (1) a horizontal stored position shown in FIG. 4, (2) an upwardly inclined preparatory position shown in FIG. 5, and (3) an operative position as shown in FIG. 6, which is similar to FIG. 4 but the lip 18 is extended and engages the vehicle bed B. A lip or extension plate 18 is hingedly connected to the front portion of the deck 16. The deck 16 is configured so that it will overlie and enclose the open top of the recess 3 and be substantially flush with the dock 1 when the deck 16 is not in use as shown in FIG. 4.

Figure 4:
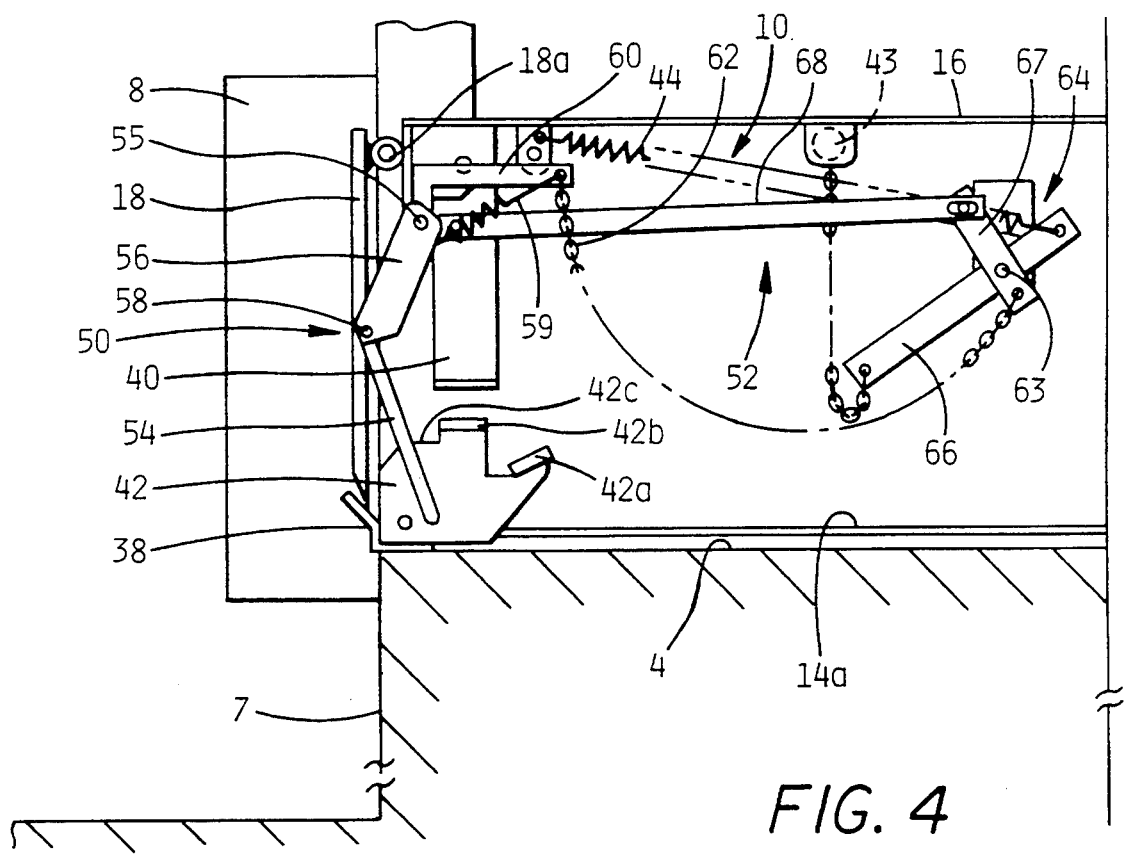
FIG. 4 is a side view of the dock leveler and the safety leg control assembly of FIG. 1 and illustrates the lip in the pendant position, the leg control assembly in the stored position, and the safety leg in a supporting position.
Figure 5:
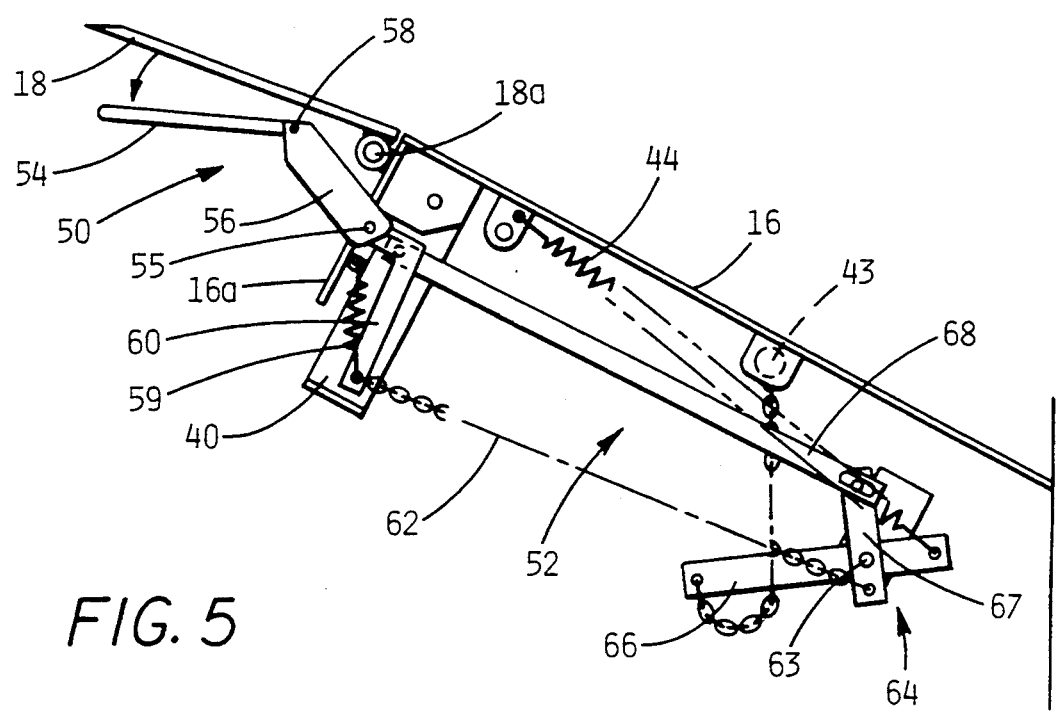
FIG. 5 is a side view of the dock leveler and the safety support assembly of FIG. 1 and illustrates the lip in a fully extended or preparatory position, the leg control assembly in a preparatory or partially extended position, and the safety leg in the supporting position.
Figure 6:
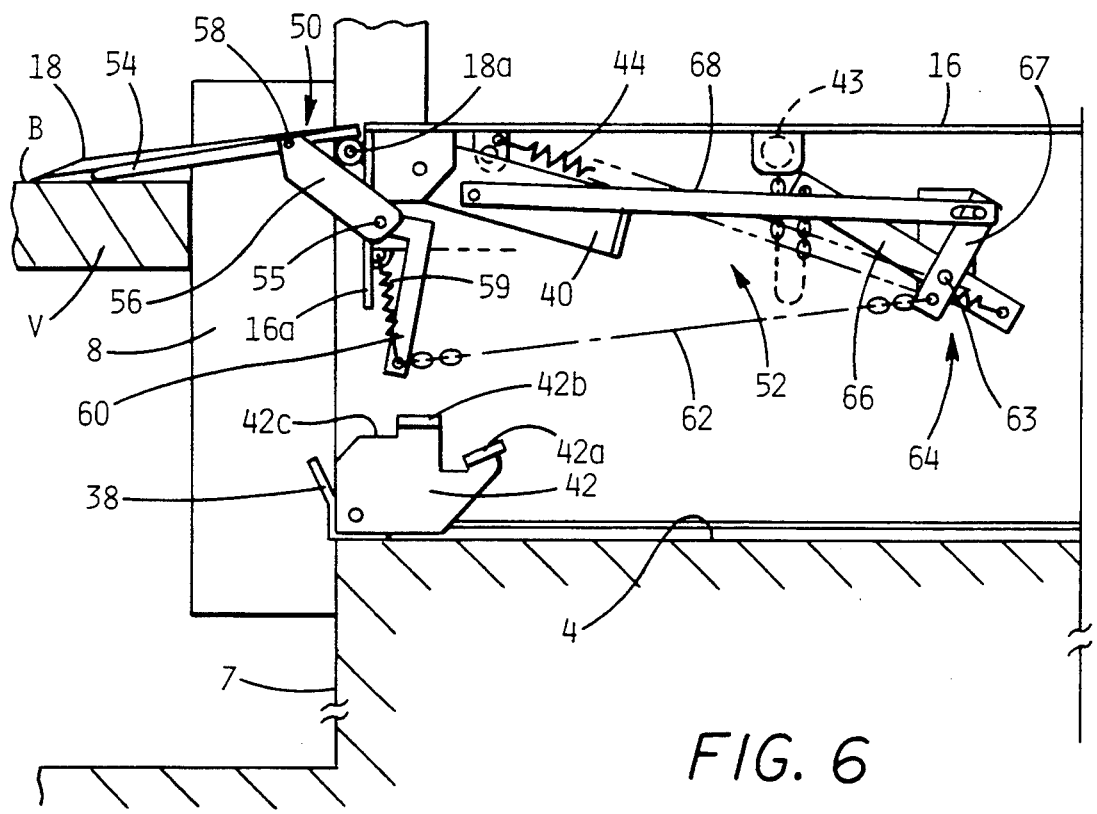
FIG. 6 is a side view of the dock leveler and the safety leg assembly of FIG. 1 and illustrates the lip engaging the bed of the vehicle, the leg control assembly in the activated or depressed position, and the leg in a retracted or non-supporting position.

Means for lifting the deck 16 from the stored position shown in FIG. 4 to the preparatory position in FIG. 5 are conventional and well known. In the illustrated embodiment, the lifting means comprises a plurality of heavy duty tension springs 20 which bias the deck 16 to pivot upwardly about the rear edge 16b. Each spring 20 has one end connected to the underside of the deck 16 adjacent to the rear edge portion 16b thereof. The other end of the spring 20 is connected to the crossbar 22 which is secured to the free end 24a of a follower arm 24 which has the anchor end 24b thereof pivotally connected to floor section 14a. The free end 24a of arm 24 is provided with a roller 26 which engages a cam plate 28 attached to the underside of deck 16. To control the pivoting of the deck 16 from its horizontal inoperative position shown in FIG. 4, a conventional deck holding unit 30 is provided. One end 30a of the holding unit 30 is pivotally connected to the underside of the deck 16 and the opposite end 30b of the holding unit 30 is pivotally connected to the floor section 14a. A typical deck holding unit 30 is described in U.S. Pat. No. 4,531,248 issued to Swessel et al. which is hereby incorporated herein. In another embodiment (not shown), the lifting means may comprise a conventional hydraulic lift which raises and lowers the deck 16 and is also well-known in the art.

The lip or extension plate 18 has a first end 18a hingedly connected to a deck header 16a in a conventional manner and a second end 18b which is adapted to engage the bed B of a vehicle V and the like. The lip 18 may be actuated between a pendant stored position shown in FIG. 4 and an extended preparatory position shown in FIG. 5 by any conventional means. A novel actuating means is described in U.S. patent application Ser. No. 07/972,192, which was filed on Nov. 5, 1992, by Scott Springer and which is incorporated herein by reference.

The illustrated embodiment of the lip actuating assembly 32 has a three-ended crank 34 pivotally attached to the underside of the deck 16 and operatively connected to the lip 18. An extending means operatively connected to the lip 18 for extending the lip 18 in response to the rotation of the deck 16 comprises a snubbing cable 37 fixedly anchored to the frame 14 and the first crank end 34a. An arm 36 operatively connects the lip 18 and a second crank end (not shown). When the lifting means raises the deck 16, the cable 37 rotates the crank 34 and the arm 36 extends the lip 18. A pivot controlling means operatively connected to the lip 18 controls the rotation of the lip 18 in a programmed manner. The pivot controlling means comprises the crank 34 and biasing means 39 which (1) permits slow rotation of the lip 18 during the first portion of the lip descent so that the operator can lower the deck 16 and extended lip 18 to engage the bed B of a vehicle V, (2) progressively increases the rate of rotation of the lip 18 during the latter portion of the lip descent so that the dock leveler 12 can be stored more quickly and receive the next vehicle V, and (3) assists the lip extension.

From the extended preparatory position (shown in FIG. 5), the lip 18 can descend upon moving the deck 16 to the operative position (as shown in FIG. 6) and is adapted to span the gap which exists between the front of the loading dock 1 and the bed B of the parked vehicle V to be unloaded or loaded. The lip 18 allows a forklift truck and dock personnel to readily move between the deck 16 and the bed B of the vehicle V. The length of the lip 18 substantially spans the distance between the bumpers 8 and is preferably formed of tread plate steel and thus capable of withstanding substantial loads. The width of the lip 18 is adapted so the lip 18 supports the deck 16 in a generally horizontal stored position when the free end 18b is supported by the keepers 38.

When the deck 16 is to be activated for loading or unloading a vehicle V parked adjacent the front wall 7 of the dock 1, the biasing forces of the springs 20 raise the deck 16 to its full upwardly pivoted preparatory position as shown in FIGS. 1 and 5 whereupon the lip 18 will automatically assume its extended position. Once this has occurred, the operating dock personnel will normally walk outwardly onto the deck 16 thereby overcoming the bias of springs 20 and causing the deck 16 and the extended lip 18 to pivot downwardly until the extended lip 18 engages the top of the bed B of the parked vehicle V in the operative position.

After the loading operation has been completed and the vehicle V pulls away from the dock 1, the deck 16 normally remains in the loading position due to the upwardly biased condition and the lip 18 falls to the pendant position. If the deck 16 is at an above-dock level position, the operator merely walks out on the deck 16 and the weight of the operator will overcome the biasing effect to pivot the deck 16 downwardly to the cross traffic position where the lip 18 will engage the keepers 38 to support the deck 16 in the cross traffic position. If the deck 16 is at a below-dock level position, the operator pulls on a chain (not shown) to release the ramp holding unit 30 so that the dock leveler 12 extends to its fully-extended position. The operator walks the dock leveler 12 down to release the tension on cable 37 and to allow the lip 18 to fall to the pendant position so that the dock leveler may be lowered to the stored position.

Figure 2:
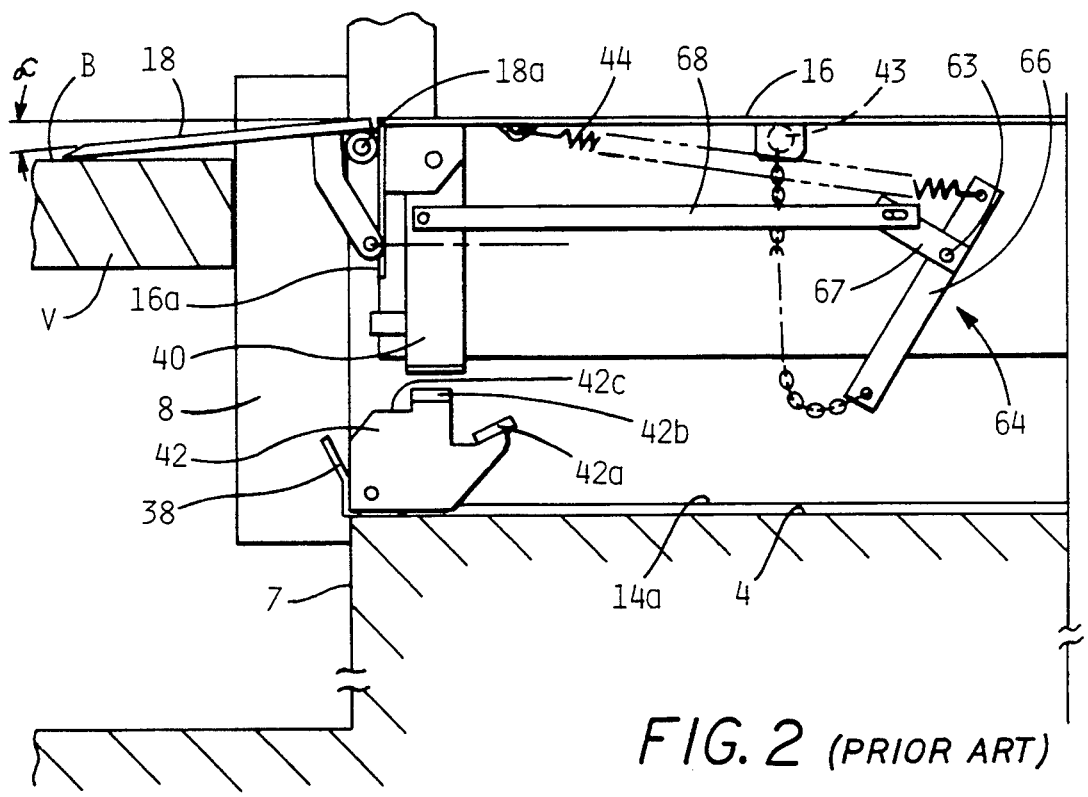
FIG. 2 is a side view of a conventional dock leveler and illustrates the lip engaging the bed of the vehicle, and a safety leg in a pendant or active supporting position.
Figure 3:
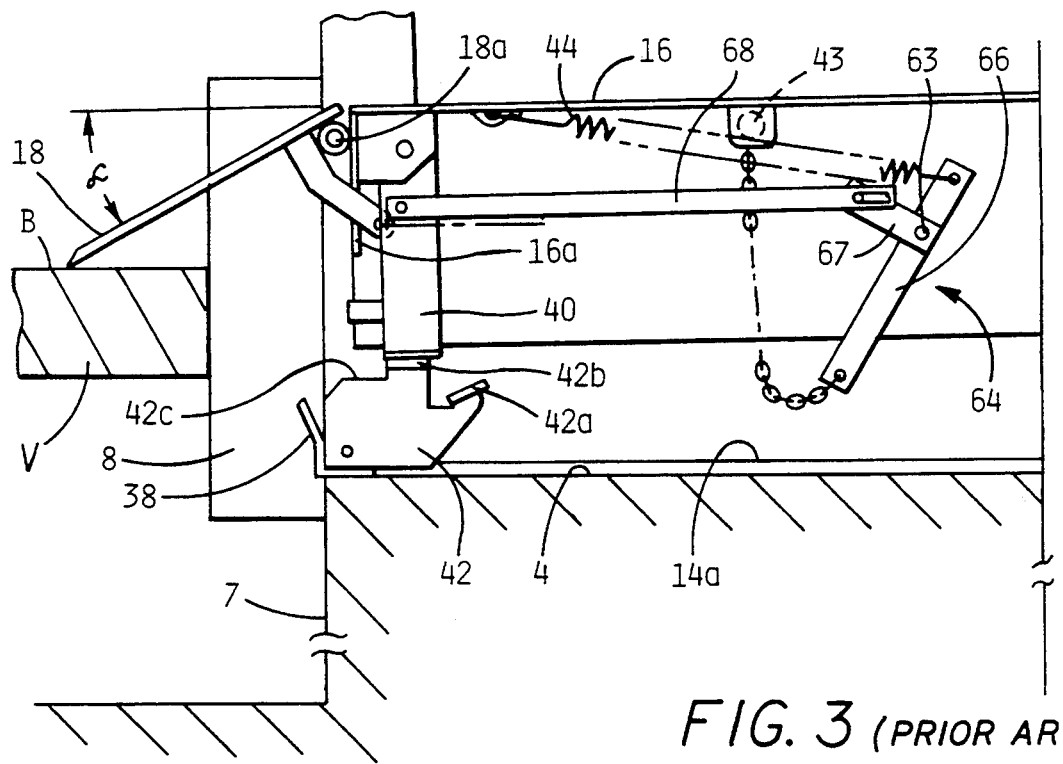
FIG. 3 is a side view of the dock leveler of FIG. 2 in a "stomp-out" position.

A typical conventional dock leveler 12 as shown in FIGS. 2-3 has a safety leg 40 which limits the vertical fall that would occur in the event of a premature departure of the vehicle V and which may also support the deck 16 in a horizontal and a number of below-dock level positions. In the illustrated embodiments, at least one and preferably a pair of safety legs 40 are pivotally mounted to the underside of the deck 16 for movement between a pendant, downwardly hanging or active supporting position shown, for example, in FIG. 2 and a retracted, inactive or non-supporting position shown, for example, in FIG. 6. In the active supporting position, the legs 40 are adapted to engage upwardly extending stops 42 provided on the floor section 14a in the event that the vehicle V should depart the dock 1 while a load is on the deck 16 causing the deck 16 to inadvertently fall. In the non-supporting position, the legs 40 permit the deck 16 to service below-dock level vehicles V. The legs 40 are typically spaced on either side of the deck 16.

A linkage assembly 64 is provided for manually positioning the legs 40 between the supporting and non-supporting positions. The linkage assembly 64 comprises a shaft 63 operatively connecting the legs 40 such that rotation of the shaft 63 causes rotation of both legs 40, and links 67 which are pivotally connected to links 68 such that clockwise movement of link 66 causes clockwise rotation of links 67 and links 68 to position the safety legs 40 in the non-supporting position. Conversely, counterclockwise movement of link 66 causes links 68 to position the legs 40 to the supporting position.

In the typical conventional dock leveler shown in FIGS. 2-3, the legs 40 may be left in their supporting positions in order to service an above-dock level vehicle V. Since the vehicle bed B is above the level of the dock 1, the pendant legs 40 will not interfere with the operation of the dock leveler 12. If the vehicle V were to prematurely depart from the loading dock 1 when there is load on the deck 16, the pendant legs 40 will engage the stops 42 to support the deck 16, thereby preventing the deck 16 from hitting the pit floor 4.

However, in order to service a below-dock level vehicle V, the operator must position the legs 40 to the non-supporting position such as shown in FIG. 6. Typically, the operator manually pulls chain 43 mounted on the deck 16, thereby actuating shaft 63 and linkages 66, 67 and 68 so as to pivot the safety legs 40 from the supporting position in FIG. 2 to the non-supporting position in FIG. 6. An extension spring 44 returns the legs 40 from the non-supporting to the supporting position, as the chain 43 is released and the deck 16 is raised high enough for the legs 40 to clear stops 42.

One drawback to conventional legs is called a "stomp out" situation illustrated in FIG. 3. It is generally desirable that the orientation of the lip 18 and deck 16 be substantially planar as shown in FIG. 2 or form a relatively small acute angle ($\alpha$). The "stomp out" situation typically occurs when the initial height of the vehicle bed B is slightly above the height in which the safety legs 40 engage their stops 42 and when the relatively heavy forklift truck drives onto the vehicle bed B, thereby lowering the height of the vehicle bed B. When the height of the vehicle bed B lowers, the lip 18 follows the descending vehicle bed B, forming a relatively large acute angle ($\alpha$) with the deck plate 16 (as shown in FIG. 3), and making it difficult or impossible for the material handling vehicle to exit the vehicle V. The safety legs 40 engage the stops 42 and prevent the deck 16 from descending and maintaining the desired substantially planar orientation with the lip 18.

Figure 12:
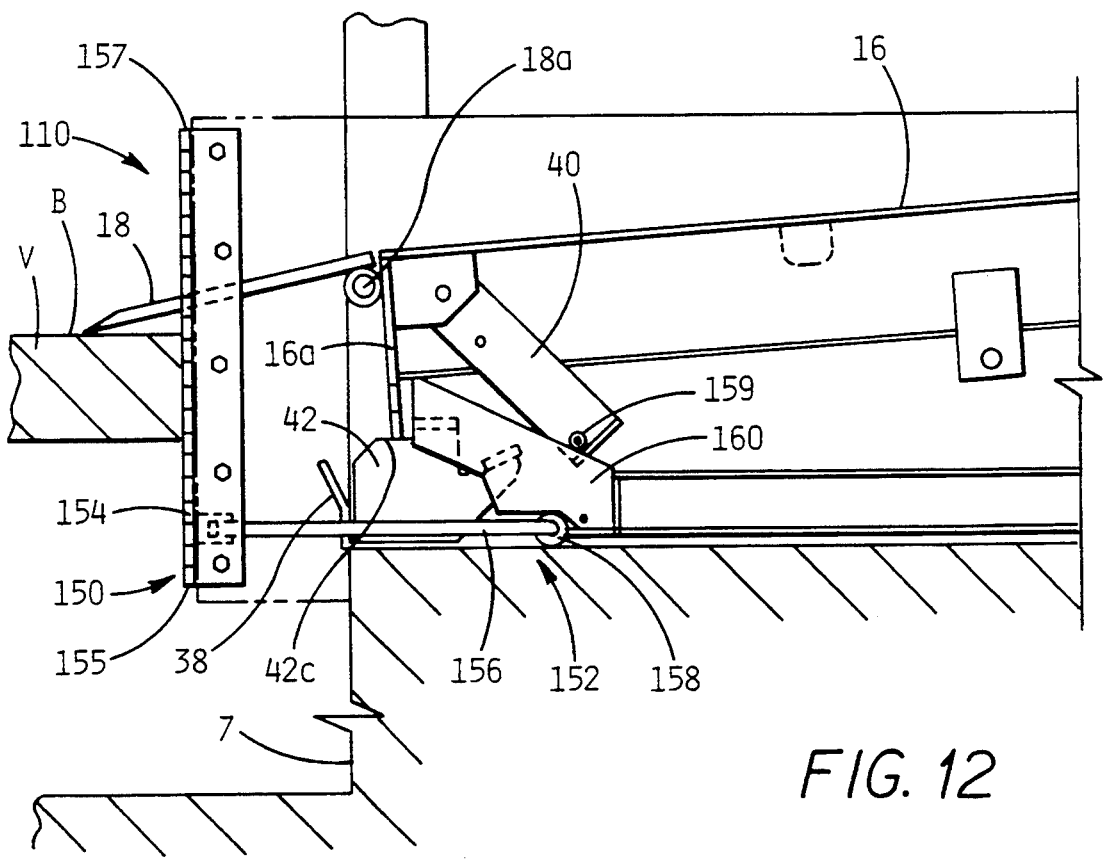
FIG. 12 is a side view of a dock leveler and the safety support assembly of FIG. 10 and illustrates the dock leveler in the below-dock level position, the sensor plate of the leg control assembly in the compressed position, and the leg in a retracted and non-supporting position and unable to support the deck because the leg deflector is in the active position.

Furthermore, in conventional dock levelers, as illustrated in FIGS. 2-3, the safety legs 40 and the stops 42 typically only have one or two stop positions. Each stop 42 has a first stop 42a for a dock-level position and a second stop 42b for a below-dock level position. The ramp header 16a is adapted to engage a third stop 42c so as to limit the downward movement of the deck 16 as best shown in FIG. 12.

In accordance with certain objects of the invention, a vehicle-activated safety leg control assembly 10 is provided comprising a sensor assembly 50 which senses the position of the vehicle V relative to the dock leveler 12 and an actuation assembly 52 which is operatively connected to the safety legs 40 so as to actuate or maintain the legs 40 in the non-supporting position in response to the position of the vehicle V. The actuation assembly 52 is adapted to automatically position the legs 40 between (1) a retracted, inactive or non-supporting position when the vehicle V is in close proximity to the loading dock and (2) a pendant, active, or supporting position when the vehicle V is greater than a predetermined distance from the loading dock. The control assembly 10 is adapted to activate the legs 40 and move the legs 40 to the supporting position as the vehicle V pulls away from the dock leveler 12 but before the lip 18 loses contact with the vehicle V. The control system 10 permits the legs 40 to be in the active supporting position when the lip 18 is extended but not safely supported by the vehicle bed B.

In accordance with certain objects of the invention, the control system 10 deactivates the safety legs 40 when the vehicle V is positioned within a predetermined distance from the dock leveler 12 and activates the legs 40 when the vehicle V is positioned greater than the predetermined distance from the dock leveler 12. The predetermined distance between the vehicle V and the dock leveler 12 is selected so that the extended lip 18 is in sufficient contact with the vehicle bed B to support the deck 16 and prevent the vertical fall of the deck 16. Similarly, the predetermined distance between the vehicle V and the lip 18 is selected so that the legs 40 are in the active supporting position prior to the lip 18 losing contact with the vehicle bed B. As the vehicle V arrives with the leveler 12 in the stored position, the leveler 12 is normally supported by the lip 18 in the lip keepers 38. However, if the lip 18 is not stored in the lip keepers 38, the legs 40 are still maintained in the active supporting position unless a vehicle V is in close proximity to the dock 1.

The First Embodiment

A first embodiment of the vehicle-activated safety leg control assembly 10 is illustrated in FIGS. 1 and 4–9. In accordance with certain objects of the invention, the control system 10 only deactivates the safety legs 40 when the lip 18 is safely supported on the vehicle bed B.

Figure 7:
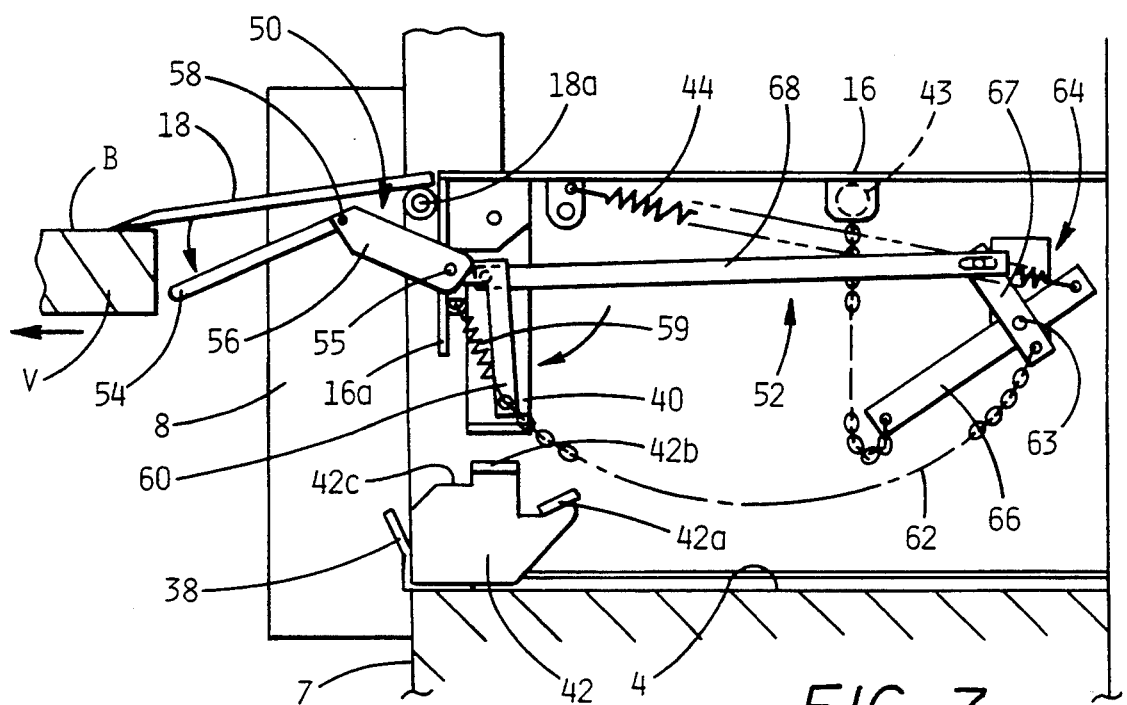
FIG. 7 is a side view of the dock leveler and the safety leg assembly of FIG. 1 and illustrates the vehicle in the process of departing the loading dock, wherein the lip maintains engagement with the bed of the vehicle, the leg control assembly is in the deactivated or disengaged position, and the safety leg is in the pendant or active supporting position.
Figure 8:
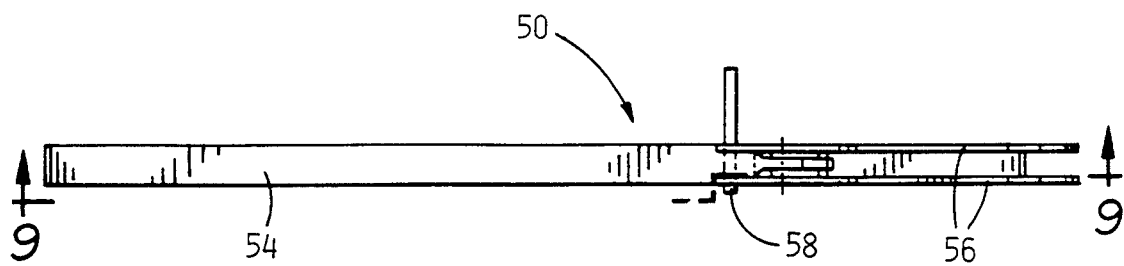
FIG. 8 is an enlarged top view of the sensor assembly.
Figure 9:
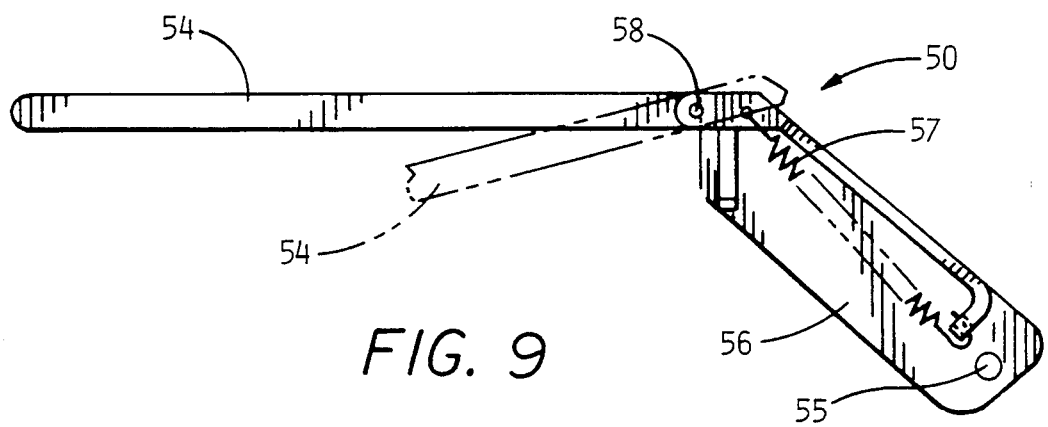
FIG. 9 is a side view of the sensor assembly taken along line 9—9 in FIG. 8.

The sensor assembly 50 senses the presence and position of the vehicle bed B. The sensor assembly 50 comprises a sensor bar 54 and a carrying unit 56. The proximal end of the sensor assembly 50 is pivotally connected to the deck 16 of the dock leveler 12 by pin 55 for pivotal movement between (1) a stored downwardly hanging position as shown in FIG. 4, (2) a partially extended position as shown in FIG. 5 wherein the sensor bar 54 is adapted to engage the vehicle bed B, and (3) a fully extended, depressed position as shown in FIG. 6 when the lip 18 rests upon the vehicle bed B. The sensor assembly 50 is preferably located adjacent one of the side edges of the lip 18 but may be disposed between the sides of the lip 18 as long as it is capable of engaging the vehicle bed B. If the sensor assembly 50 is disposed between the lip sides, the underside 18c of the lip 18 will require a groove (not shown) adapted to receive the sensor bar 54. When the lip 18 and the sensor bar 54 engage the vehicle bed B, the distal end of the sensor bar 54, which engages the vehicle bed B, is spaced at a predetermined distance inboard of the distal end of the lip 18 as best shown in FIG. 6. Thus, the sensor bar 54 loses contact with the bed B before the lip 18 when the vehicle V departs from the loading dock 1 as best shown in FIG. 7.

The proximal end of the sensor bar 54 is pivotally connected to the carrying unit 56 by a pin 58. When the sensor assembly 50 is in the active position shown in solid lines in FIG. 9, the clockwise rotation of the sensor bar 54 is transmitted to the crank 60 through pin 55. The proximal end of the sensor bar 54 is equipped with an extension spring 57 that maintains the sensor bar 54 in its active position. The sensor bar 54 may freely rotate in the counterclockwise direction relative to the carrying unit 56 to be yieldable upon frontal impact by the rearward movement of the vehicle V as shown in phantom in FIG. 9.

The sensor assembly 50 is operatively attached to the legs 40 by the actuation assembly 52. In this embodiment, the actuation assembly 52 comprises a crank 60 pivotally mounted to the deck section 16, chain 62, and the safety leg linkage assembly 64. The carrying unit 56 is rigidly attached to a crank 60 by pin 55 so as to transmit the clockwise rotation of the sensor bar 54 to the crank 60. The clockwise rotation of the sensor assembly 50 is limited by the pin 58 which is adapted to engage the underside 18c of the lip 18 so that the sensor assembly 50 does not extend above the lip 18 and remains below the lip 18 as the lip 18 travels to its stored position. A spring 59 connects the crank 60 and the deck header 16a to rotate the sensor assembly 50, in the clockwise direction, to the partially extended and preparatory position in FIG. 5. The clockwise rotation of the crank 60 pulls the connecting chain 62 (to the left in FIG. 6) to rotate the shaft 63 connecting the spaced safety leg linkage assemblies 64 and the safety legs 40 between the supporting position shown in FIG. 5 and the non-supporting position shown in FIG. 6. It will be appreciated that both legs 40 are operatively connected to each other by the shaft 63 and the leg linkage assembly 64 such that the legs 40 move in unison in response to rotation of the shaft 63 as described previously.

In operation, the dock leveler 12 is initially in its stored position as shown in FIG. 4 wherein the lip 18 is in its pendant and stored position, the sensor assembly 50 is captured by stop pin 58 and the legs 40 are in the pendant and supporting position. In the supporting position, the legs 40 are capable of limiting the downward movement of the deck 16.

After the vehicle V has parked in the loading dock 1, the dock leveler 12 is activated in the normal manner as described previously. When the dock leveler 12 is activated to its fully inclined position as shown in FIG. 5, the lip 18 is fully extended. As the lip 18 is moved to the extended position, the spring 59 biases the crank 60 and the sensor assembly 50 clockwise causing it to rotate to the partially extended or preparatory position as shown in FIG. 5. The spring 59 balances the weight of the sensor bar 54 so that the sensor bar 54 is slightly below the level of the lip 18 and engages the vehicle bed B before the lip 18. It will be appreciated that the legs 40 remain in the active supporting position when the lip 18 is fully extended, and not supported by the vehicle bed B.

When the vehicle bed B is above-dock level, the operator walks the deck 16 and the lip 18 into engagement with the vehicle V so that the sensor bar 54 engages the vehicle bed B. The clockwise rotation of the sensor bar 54 is transferred through the carrying unit 56 to the crank 60. Similarly, the clockwise rotation of the crank 60 pulls the chain 62 and rotates the shaft 63 and the linkage assembly 64 so that the legs 40 are positioned from the supporting position to the non-supporting position. It will be appreciated that the safety legs 40 are automatically retracted to their non-supporting position after the lip 18 is safely supported by the vehicle bed B.

When the vehicle bed B is below-dock level, the operator initially pulls the chain 43 to retract the legs 40 and walks down the dock leveler until the lip 18 engages the vehicle bed B. It will thus be appreciated that the safety legs 40 stay automatically retracted to the non-supporting position after the lip 18 engages the vehicle bed B.

Referring to FIG. 6, it will be seen that the sensor bar 54 is slightly shorter than the lip 18 and that the distal end of the sensor bar 54 which engages the vehicle floor B is spaced at a predetermined distance inboard of the distal end of the lip 18. As the vehicle V departs from the loading dock 1, the sensor bar 54 loses contact with the bed B before the lip 18 as best shown in FIG. 7. The sensor assembly 50 including the sensor bar 54 and the carrying unit 56 rotate in a counterclockwise direction, thereby releasing the tension in the chain 62 so that the shaft 63 and the linkage assembly 64 also rotate in the counterclockwise direction in response to the biasing effect of the leg return spring 44. It will be appreciated that the legs 40 are thereby positioned to the supporting position, ready to limit the downward fall of the deck 16 in the event a forklift or other load is on the deck 16. If a load is not present on the dock leveler 12, the deck 16 will remain in its biased position until the operator returns the dock leveler 12 to the stored position in FIG. 4 in the normal manner.

The Second Embodiment

A second embodiment of the vehicle-activated safety leg control assembly 110 is illustrated in FIGS. 10-14. A conventional leg linkage assembly 64 may be attached to the legs 40 to provide manual control as previously described. The assembly 64 has not been shown in FIGS. 10-14 in order to simplify the drawings.

Figure 10:
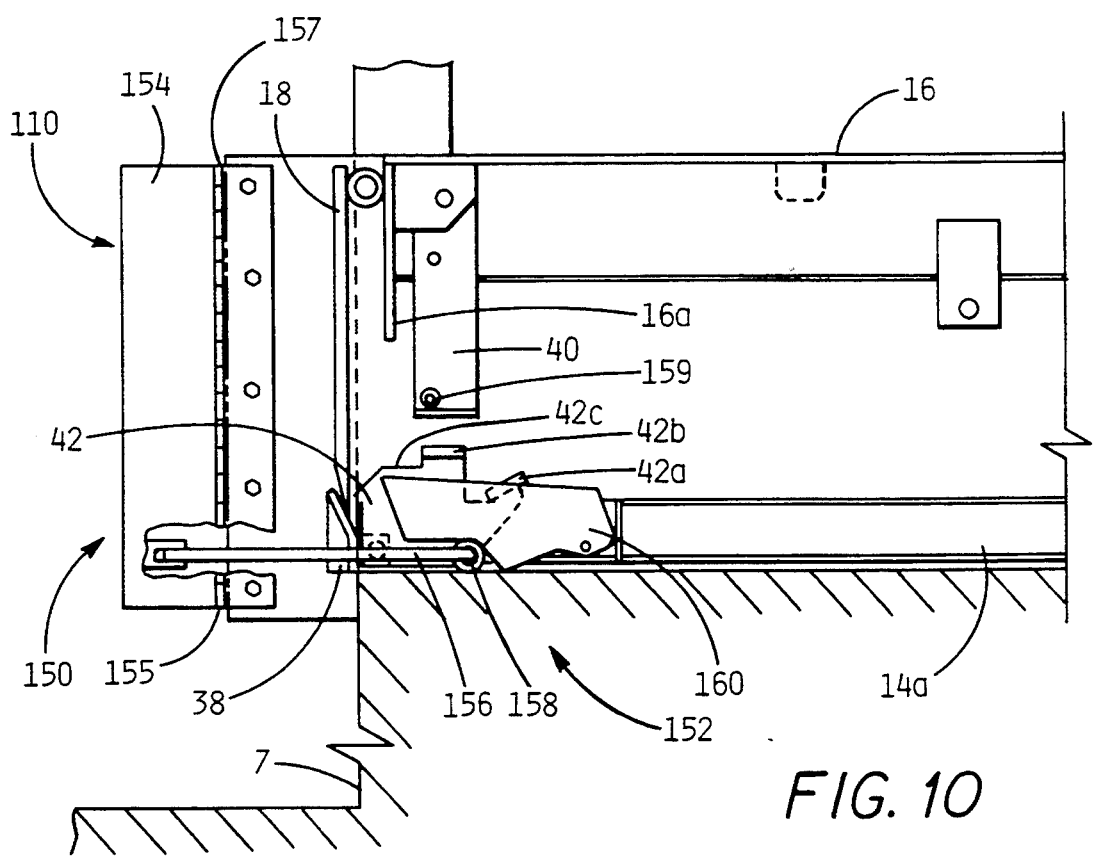
FIG. 10 is a side view of a dock leveler and a second embodiment of a vehicle-activated safety leg control assembly in accordance with the invention and illustrates the lip in the stored position, the sensor plate of the leg control assembly in the extended position, and the leg in the supporting position.
Figure 11:
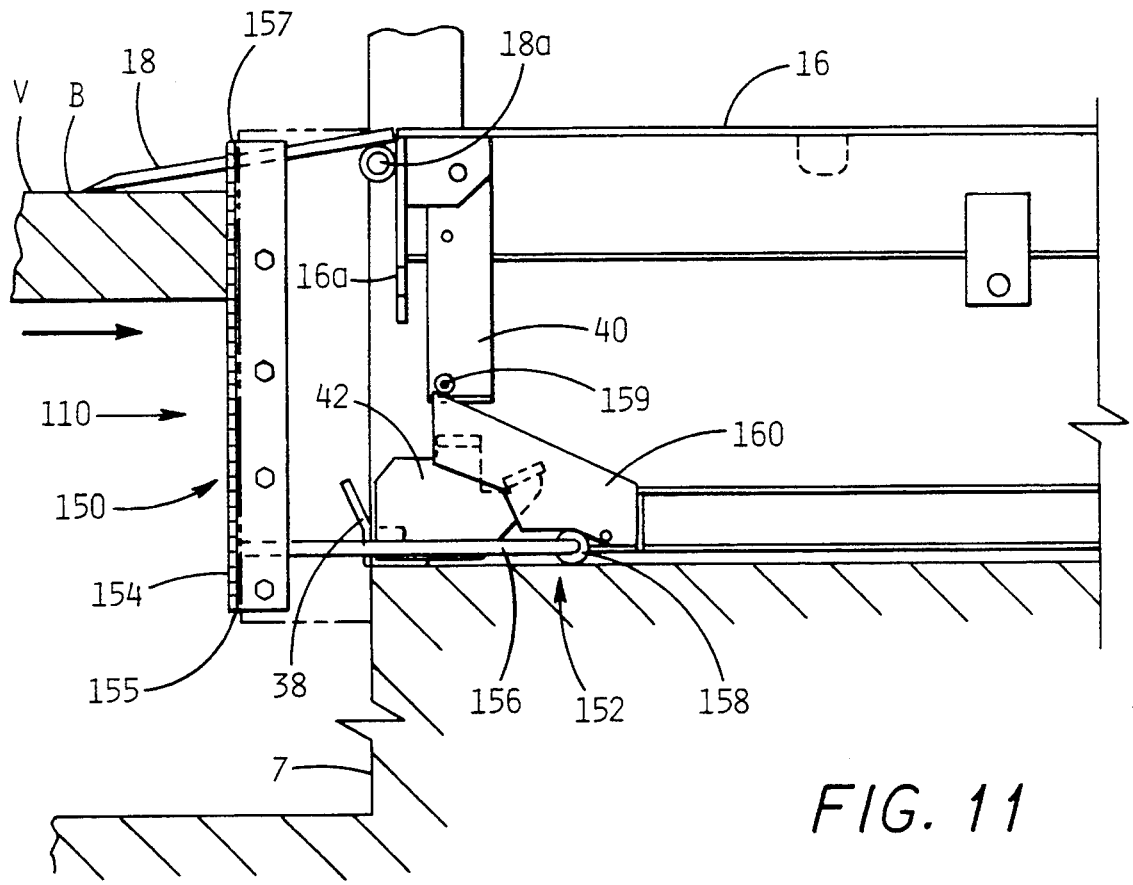
FIG. 11 is a side view of a dock leveler and the safety support assembly of FIG. 10 and illustrates the dock leveler at dock-level, the sensor plate of the leg control assembly in the compressed position, and the leg in the supporting position but unable to support the deck because the leg deflector is in the active position.

The sensor assembly 150 senses the presence of the rear frame of the vehicle V and comprises a sensor plate 154 which is preferably spaced away from the building wall 7, and a torsion spring 155 disposed about a vertical axis 157. The sensor plate 154 is adapted to engage and be activated by the rear frame portion of the incoming vehicle V. The sensor plate 154 is mounted for movement inwardly towards the wall 7 when the vehicle V moves towards the loading dock 1 and outwardly away from the wall 7 when the vehicle V departs from the loading dock 1. FIG. 10 shows a side view of the dock leveler 12 in the stored position and the sensor plate 154 in the extended position. FIGS. 11 and 12 show the sensor assembly 150 in the compressed position and the deck 16 at dock level and below-dock level, respectively.

Figure 13:
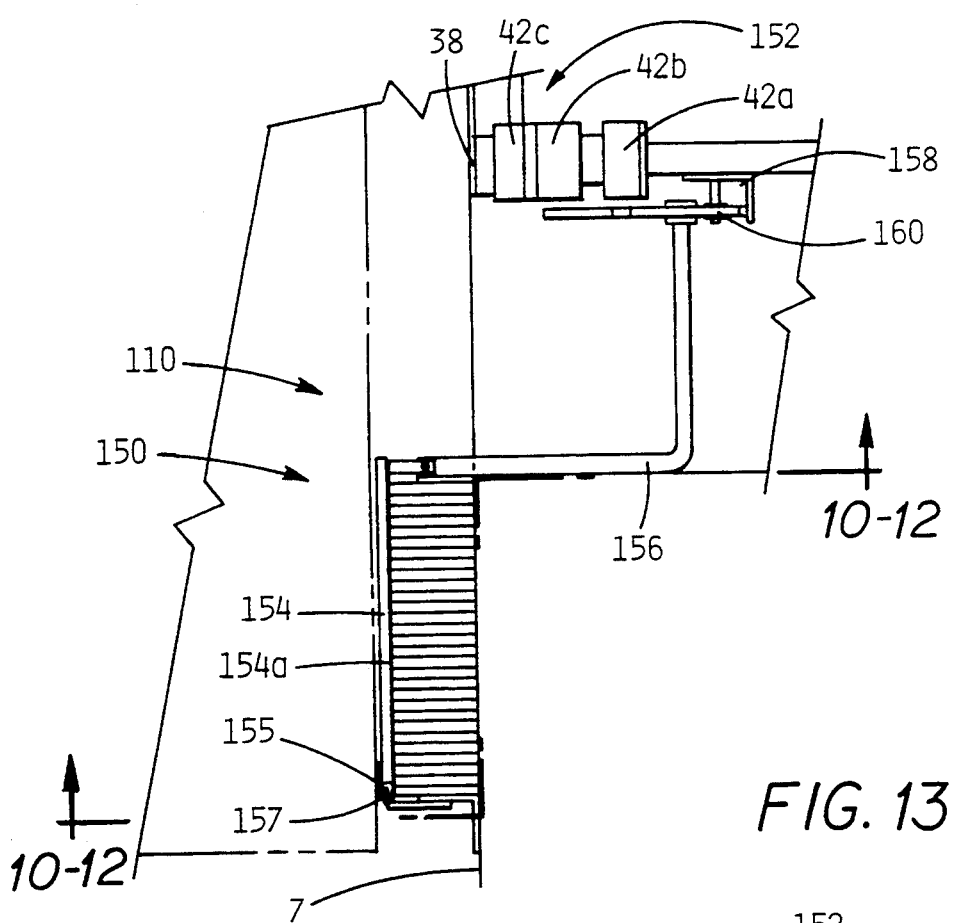
FIG. 13 is a partial top view of the safety support assembly of FIG. 10 and illustrates the sensor plate of the leg control assembly in the compressed position.
Figure 14:
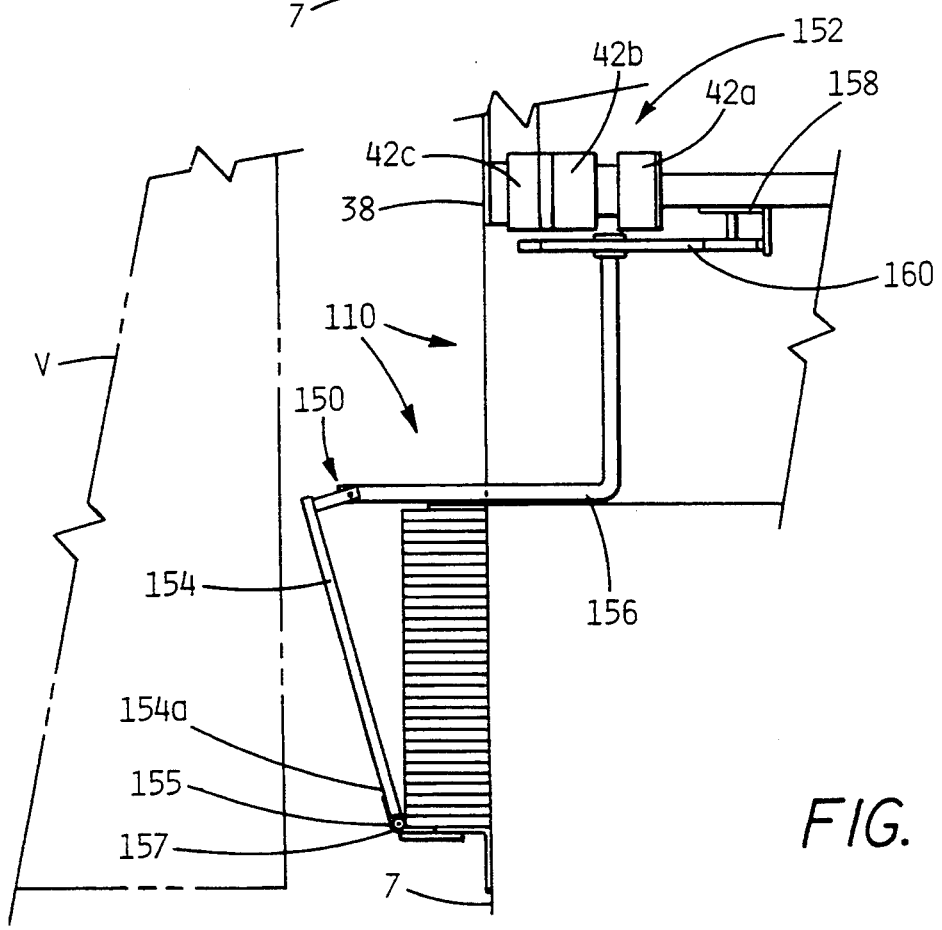
FIG. 14 is a partial top view of the safety support assembly of FIG. 10 and illustrates the sensor plate of the leg control assembly in the extended position.

In one embodiment of the sensor assembly 150, illustrated in FIGS. 10-14, one end 154a of the sensor plate 154 is pivotally mounted along a vertical axis 157 disposed on the edge of the dock bumper 8 for movement between (1) the activated or extended position (as best shown in FIG. 10 and 14) wherein the sensor plate 154 projects outwardly into the path of the incoming vehicle V and (2) the deactivated or compressed position (as best shown in FIGS. 11-13) wherein the rear frame of the vehicle V forces the sensor plate 154 into engagement with the bumper 8. The sensor plate 154 is biased to the extended position by a hinge mounted torsion spring 155. It will also be appreciated that the sensor plate 154 may be hingedly mounted to the dock wall 7 or the dock leveler 12 instead of the bumper 8 as long as the sensor plate 154 is adapted to engage the incoming vehicle V.

Figure 15:
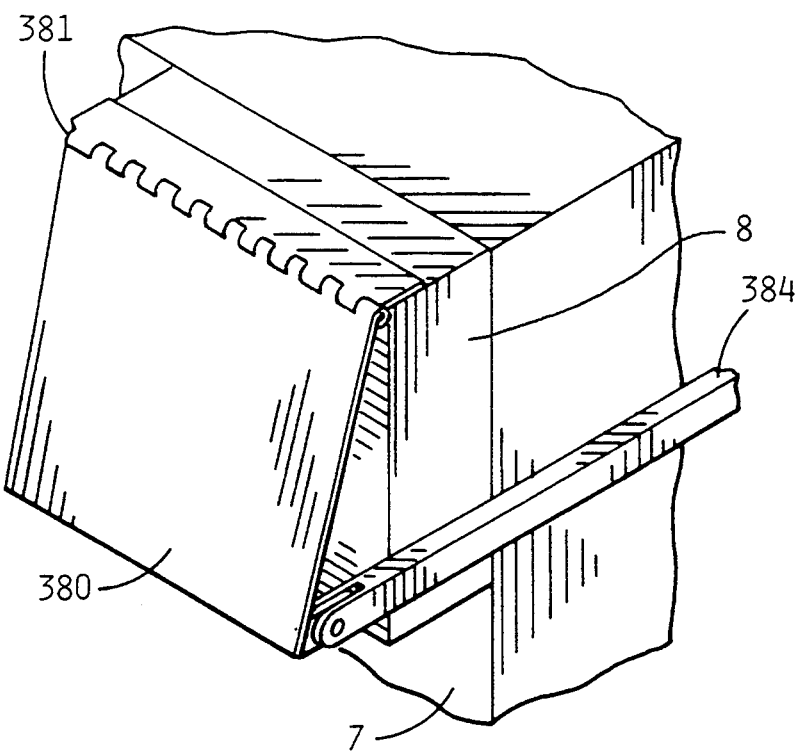
FIG. 15 is a perspective view of another embodiment of the sensor plate hingedly attached to the dock wall about a substantially horizontal axis.
Figure 16:
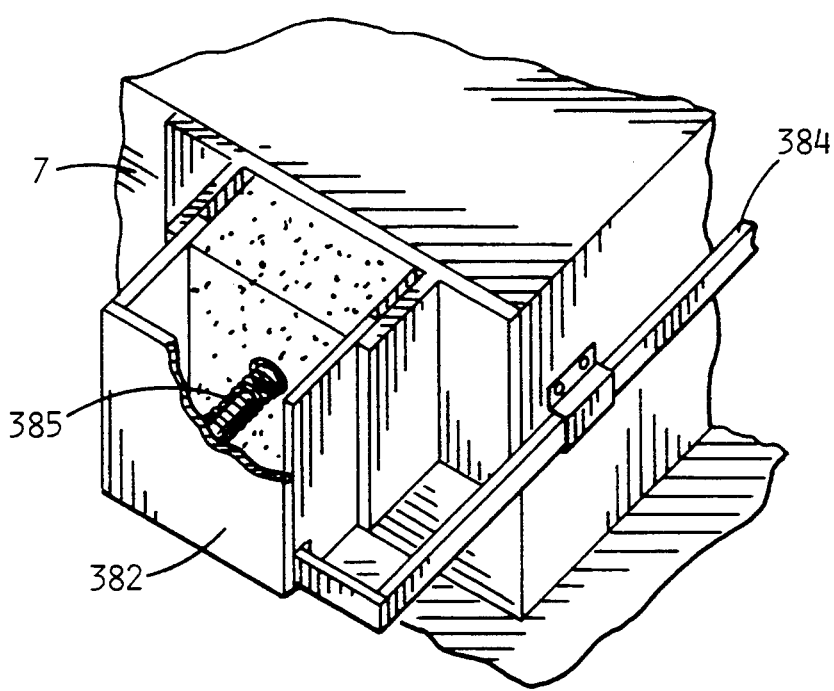
FIG. 16 is a perspective view of another embodiment of the sensor plate slidably attached to the dock wall.

Alternative embodiments of the sensor plate are shown in FIGS. 15 and 1! 6. The sensor plate 380 illustrated in FIG. 15 is hingedly attached to the dock wall 7 along a substantially horizontal axis 381 in the contrast to the sensor plate 154 illustrated in FIGS. 10-14 which pivots about the substantially vertical axis 157. The sensor plate 382 illustrated in FIG. 16 is slidably attached to the dock wall 7 for movement towards and away from the dock wall 7. The sensor plate 382 moves towards the dock wall 7 in response to the incoming vehicle V and is biased away from the wall 7 by spring 385. The sensor plates 380, 382 illustrated in FIGS. 15 and 16 operate in the same manner as the sensor plate 154. An actuation roller link 384 or other actuation assembly may be connected to either of the sensor plates 380, 382 as described in connection with the second embodiment of the vehicle-activated safety leg control assembly.

The actuation assembly 152 which operatively connects the sensor assembly 150 and the legs 40 comprises a roller link 156 and leg deflector plate 160. The actuation assembly 152 is attached to the sensor plate 154 so that the movement of the sensor plate 154 between the extended and compressed positions enables the legs 40 to be positioned between the supporting and non-supporting positions, respectively. The sensor plate 154 is attached to the roller link 156 such that the sensor plate 154 and the roller link 156 move inwardly and outwardly in unison. The roller link 156 has a roller 158 which engages the bottom cam surface of the leg deflector 160 such that the inward movement of the roller link 156 acts to the raise the deflector plate 160. Conversely, the outward movement of the roller link 156 acts to lower the deflector plate 160.

In operation, the dock leveler 12 is initially in the stored position, the torsion spring 155 biases the sensor plate to the extended position, and the legs 40 are in the supporting position as shown in FIG. 10. The rearward movement of the vehicle V into the loading dock 1 causes the rear frame of the vehicle V to engage the sensor plate 154, and move the sensor plate 154 inwardly towards the building wall 7. The movement of the sensor plate 154 from the extended to the compressed position as shown in FIG. 11 forces the roller link 156 inwardly and raises the leg deflector plate 160. The dock leveler 12 and the legs 18 are extended in the normal manner as described previously. As the dock leveler 12 is walked down, the roller 159 of the pendant leg 40 engages the raised deflector plate 160 as shown in FIG. 11. The top surface of the leg deflector plate 160 has a cam profile adapted to guide the roller 159 and leg 40 away from the supporting position and its frame stop 42 as the deck 16 is lowered to below-dock level positions.

If the vehicle bed B is at an above-dock level, the dock leveler 12 operates in the normal manner and the leg 40 remains in the supporting position and the deflector plate 160 remains in the raised position. When the vehicle bed B is at dock level (as shown in FIG. 11) and the deck 16 is lowered to a below-dock level position due to a heavy load, the leg roller 159 engages the cam surface of the leg deflector plate 160. The leg deflector 160 deflects and guides the roller 159 and the leg 40 away from the stop 38, thereby preventing a potential "stomp out" situation. Similarly, if the vehicle bed B is at the below-dock level in FIG. 12, the leg deflector 160 guides the roller 159 and the leg 40 away from the stop 42 so that the lip 18 may engage the vehicle bed B.

Thus, manual operation of the legs 40 is not necessary for below-dock level operations. FIG. 12 illustrates the bottommost position of the deck 16 wherein the deck header 16a engages the third stop position 42c.

After the loading Operation is completed, the dock leveler 12 may be positioned to its fully extended position (as shown in FIG. 1) in the conventional manner by pulling the chain (not shown) which releases the ramp holding unit 30 and raises the dock to its fully extended position so that the operator may subsequently return the dock leveler 12 to its stored position (shown in FIG. 10).

In the event that the vehicle V prematurely departs from the loading dock 12, the torsion spring 155 biases the sensor plate 154 towards its extended position as the vehicle V leaves the loading dock, allowing the leg deflector 160 to collapse to its lowered position. If the vehicle V is below-dock level, the safety leg 40 simultaneously rotates to its active supporting position ready to limit the downward fall of the deck 16 in the event a forklift or other load is on the deck 16. The spring 44 of the linkage assembly 64 (not shown in FIGS. 10–14) biases the legs 40 to the supporting position.

The travel of sensor plate 154 in response to the outward movement of the vehicle is predetermined to assure that the deflector 160 is fully lowered and the safety legs 40 are in the active supporting position while the extended lip 18 is still in sufficient contact with the vehicle bed B to support the deck 16 and load prior to total separation similar to FIG. 7. It will be appreciated that the outermost extended position of the sensor plate 154 should be shorter than the distal end of the lip 18 so that the sensor plate 154 loses contact with the vehicle V before the lip 18 loses contact with the bed B.

The Third Embodiment

Figure 17:
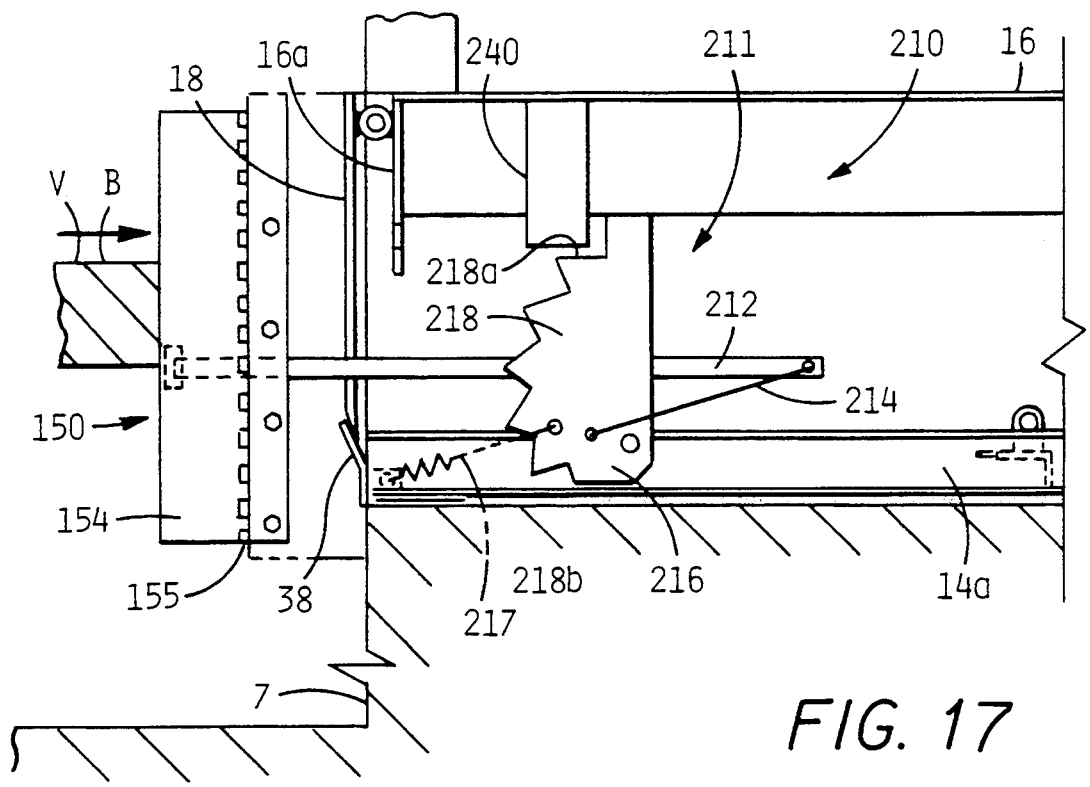
FIG. 17 is a side view of a dock leveler and a third embodiment of a vehicle-activated safety leg control assembly in accordance with the invention and illustrates the dock leveler in the stored position and the sensor plate of the leg control assembly in the extended position without the leg engaging the adjustable support assembly.
Figure 18:
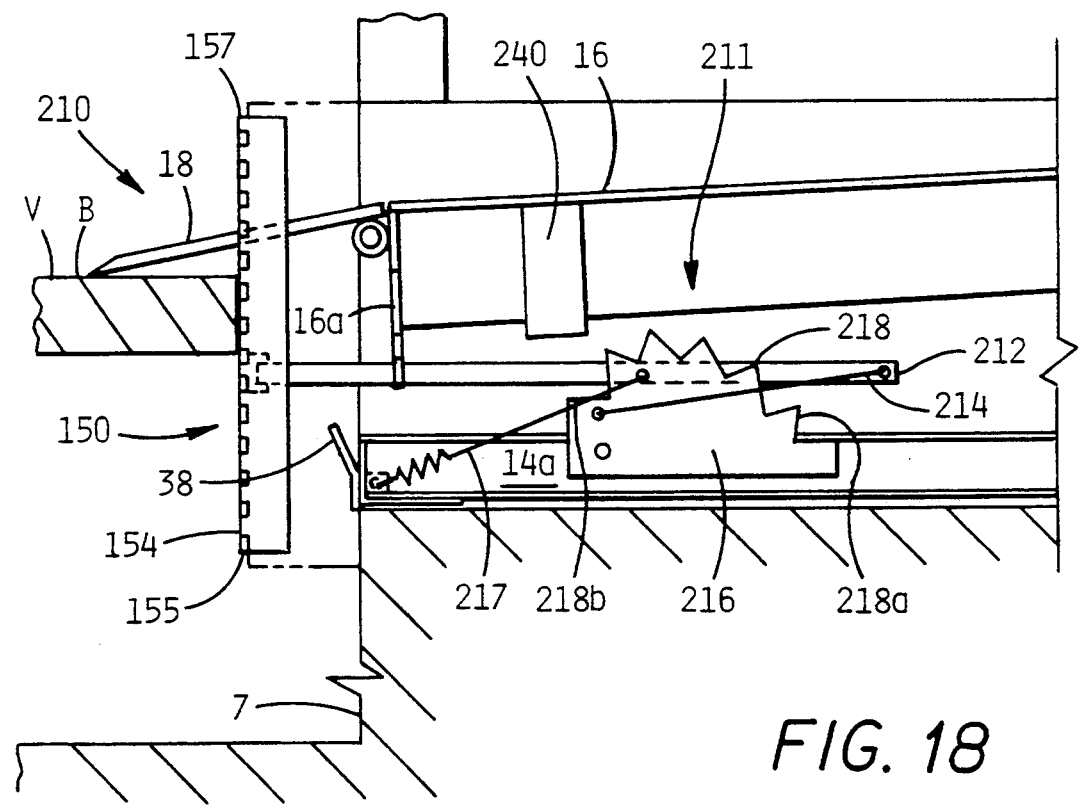
FIG. 18 is a side view of a dock leveler and the safety leg control assembly of FIG. 17 and illustrates the dock leveler in a below-dock level position and the sensor plate of the leg control assembly in the compressed position without the leg engaging the adjustable support assembly.
Figure 19:
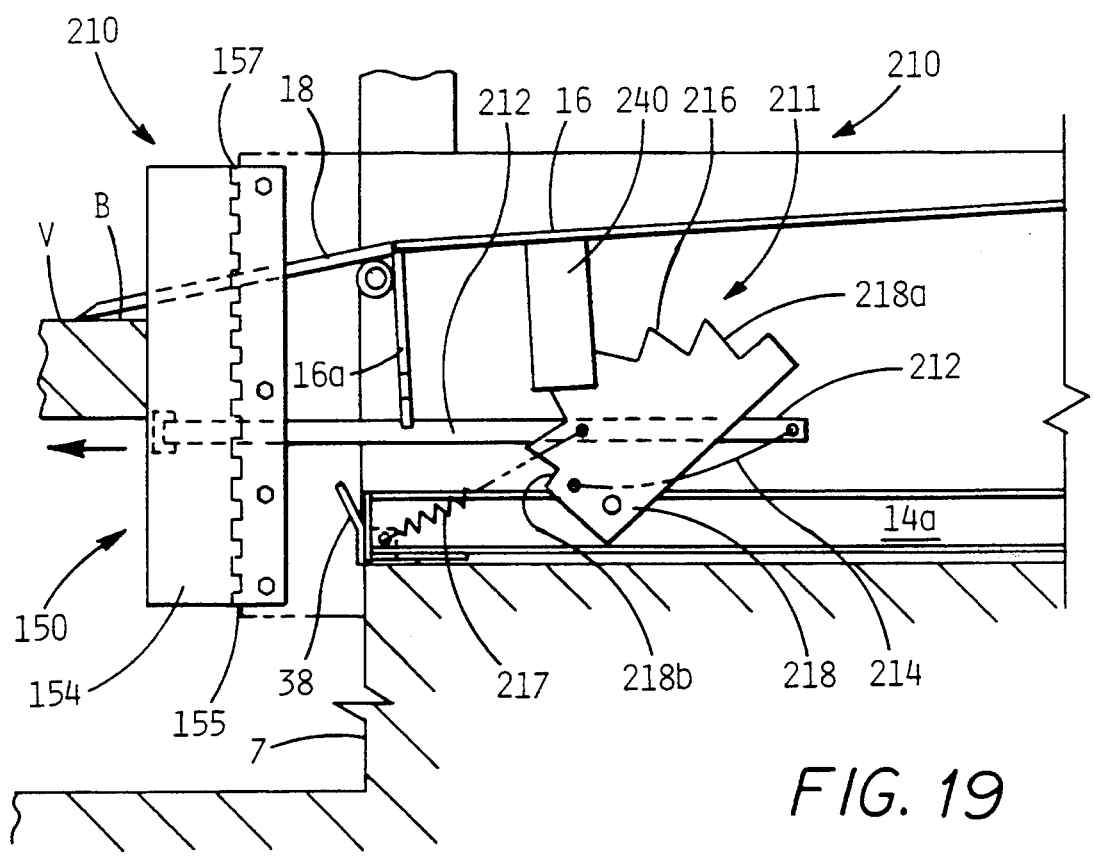
FIG. 19 is a side view of a dock leveler and the safety leg control assembly of FIG. 17 and illustrates the dock leveler in a below-dock level position and the sensor plate of the leg control assembly in a partially extended position with the leg engaging the support assembly as the vehicle moves away from the dock.

A third embodiment of the vehicle-activated safety leg control assembly 210 is illustrated in FIGS. 17–19. In this embodiment, the assembly 210 is provided with numerous stop positions which allows the deck 16 to be stopped with minimal free-fall descent, minimizing the acceleration and impact on the components, materials and personnel. The structure and operation of the sensor assembly 150 is identical to the second embodiment.

In the third embodiment, the actuation assembly 211 comprises an actuation bar 212 mounted to the dock leveler 12 or the loading dock wall 5 for movement in unison with the sensor plate 154. One end of the bar 212 is attached to the sensor plate 154 and the other end of the bar 212 is attached to a snubbing cable 214, link or the like.

The control assembly 210 also comprises an indexed cam 216 having a plurality of stops 218 adapted for receiving the safety leg 240 which is fixed to deck 16 and adapted for supporting the deck 16. The cam 216 is preferably pivotally attached to the floor section 14a for movement between lowered and raised positions in response to the position of the actuation bar 212. In the raised position shown in FIG. 17, the cam 216 is adapted to support the deck 16 at dock level. In the lowered position shown in FIG. 18, the cam 216 is adapted to support the deck 16 at full below-dock level. In the intermediate position shown in FIG. 19, the cam 216 is adapted to support the deck 16 by contacting the leg 240.

The cable 214 is attached to the cam 216 such that the inward movement of the actuation bar 212 creates a clockwise torque which rotates the cam 216 to the lowered position in FIG. 18. A return spring 217 is attached to the cam 216 and the frame floor section 14a which creates a counterclockwise torque which biases the cam 216 toward the raised position in FIG. 17. As the vehicle V moves away from the dock, the tension in cable 214 is released so that the spring 217 may rotate the cam 216 to the raised position in FIG. 17 if the deck 16 is at dock level or to an intermediate position if the deck 16 is at a below-dock level position as shown in FIG. 19.

In operation, the dock leveler 12 is initially in its stored position as shown in FIG. 17 wherein the lip 18 is in its pendant and stored position and the leg 240 is in the supporting position. The torsion spring 155 biases the sensor plate 154 to its outwardly extended position. The actuation bar 212 is similarly positioned in its outwardly extended position so that the spring 217 biases the cam 216 to its fully raised position wherein the safety legs 240 may engage the stop 218a.

As the rearward movement of the vehicle V collapses the sensor plate 154, the plate 154 and the bar 212 move to the right toward the rear pit wall 7. The rearward movement of the bar 212 rotates the cam 216 to the fully lowered position wherein the bottom stop 218b is capable of supporting the legs 240 as shown in FIG. 18. The operator may raise the dock leveler 12 and the lip 18 to its fully extended preparatory position and walk down the dock leveler 12 until the lip 18 engages the vehicle bed B as shown in FIG. 18, in the normal manner as previously described.

As the vehicle V departs the loading dock 1, the torsion spring 155 biases the sensor plate 154 towards its outwardly extended position as shown in FIG. 17. Similarly, the bar 212 moves outwardly, thereby releasing the tension in cable 214 and permitting the spring 217 to rotate the cam 216 towards the raised position. If the deck 16 is at dock level or higher, the cam 216 will return to the fully raised position. If the deck 16 is at a partially below-dock level position, the cam 216 will rotate to an intermediate position as shown in FIG. 19 wherein one of the intermediate stops will supportably engage the leg 240. Thus, the leg control assembly 210 will support the deck 16 in the event the vehicle inadvertently departs from the loading dock 1 while a load rests upon the deck 16. It will be appreciated that the indexed nature of the cam 216 will limit and minimize the height differential between the intermediate stops 218 and the legs 240 so as to minimize the fall of the deck 16. The leg control assembly 210 provides numerous stop positions allowing the deck 16 to be stopped with minimal free-fall descent, minimizing the acceleration and impact on the components, materials and personnel.

The Fourth Embodiment

Figure 20:
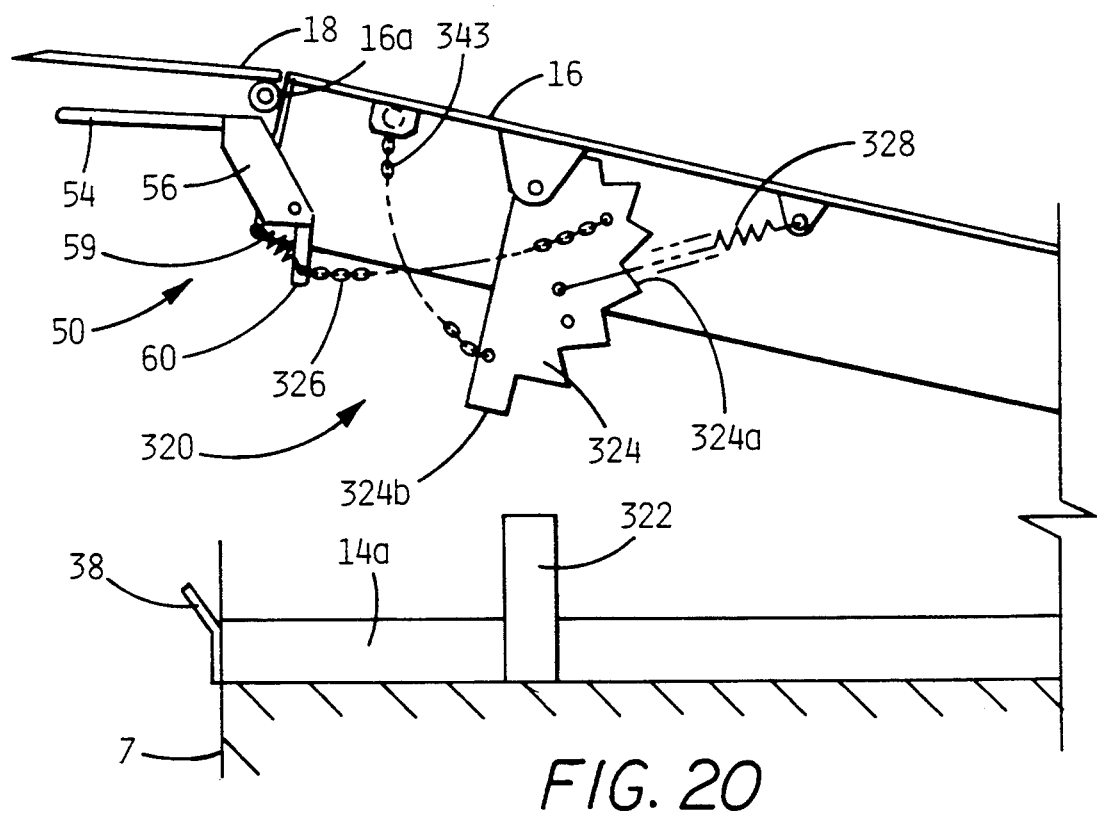
FIG. 20 is a side view of a dock leveler and a fourth embodiment of a vehicle-activated safety leg control assembly in accordance with the invention and illustrates the dock leveler lip in the fully extended preparatory position, the sensor bar of the leg control assembly in a preparatory or partially extended position, and the adjustable support assembly in a fully activated position without engaging the leg.
Figure 21:
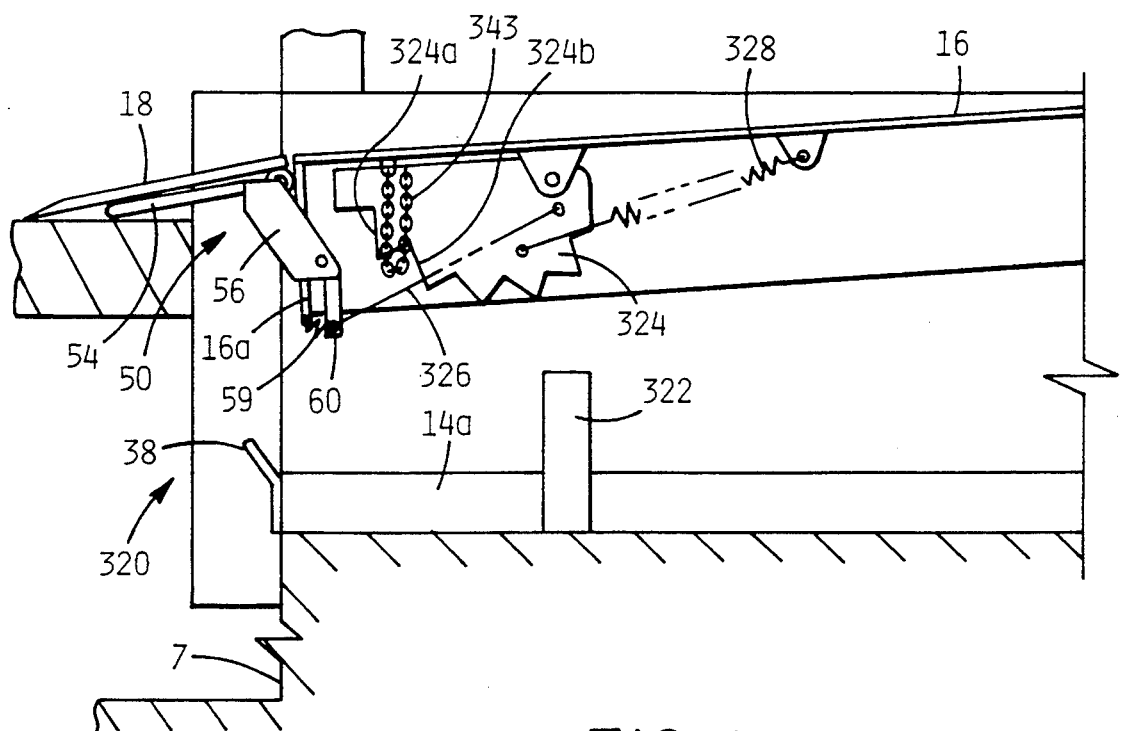
FIG. 21 is a side view of a dock leveler and the fourth embodiment of a vehicle-activated safety leg control assembly of FIG. 20 and illustrates the dock leveler lip engaging the vehicle bed, the sensor bar of the leg control assembly in the activated or engaged position, and the adjustable support assembly in the retracted or deactivated position without engaging the leg.

A fourth embodiment of the safety leg control assembly 320 is illustrated in FIGS. 20–21. In the fourth embodiment, the operation of the sensor assembly 50 is identical to the sensor assembly 50 described in the first embodiment. In contrast to the previous embodiments, the safety leg 322 is fixedly attached to the floor 14a instead of the deck 16. An indexed cam 324 is provided which operates in a manner similar to the indexed cam 216 described in the third embodiment, except that the cam 324 is pivotally attached to the underside of the deck 16 instead of the floor 14a.

A return spring 328, operatively connecting the cam 324 and the deck 16, creates a counterclockwise torque which biases the cam 324 to the raised position (shown in FIG. 20). The sensor assembly is operatively connected to the cam 324 by a chain 326, link or the like which links the proximal end of the crank 60 and the cam 324 so that the cam 324 can be positioned between the raised position (shown in FIG. 20) and a lowered position (shown in FIG. 21) in response to the position of the sensor bar 54. The indexed cam 324 is adapted to be in the raised position when the sensor assembly 50 is in the partially extended position (as shown in FIG. 20) or in the stored position (as shown, for example, in FIG. 4). The indexed cam 324 is adapted to be in the lowered position when the sensor assembly 50 is in the fully extended position (as shown in FIG. 21).

In operation, the dock leveler 12 is initially in the stored position as shown, for example, in FIG. 4. The return spring 328 creates a counterclockwise torque which rotates the cam 324 to the raised position, wherein the cam stop 324b is capable of engaging the leg 322 and limiting the downward movement of the deck 16.

After the vehicle is parked adjacent the loading dock 1, the dock leveler is raised to its preparatory inclined position as shown in FIG. 20 in the normal manner as described previously. In the preparatory position, the return spring 328 continues to exert a counterclockwise torque which biases the cam 324 to the raised position.

When the deck 16 and the lip 18 are lowered towards the vehicle bed B, the sensor bar 54 engages the bed B so that the proximal end of the sensor assembly 50 rotates in a clockwise direction, pulling the chain 326 taut and rotating the cam 324 in the clockwise direction wherein the cam 324 is positioned in the lowered position as shown in FIG. 21. In the lowered position, the cam stops 324a will not interfere with the vertical positioning of the deck 16. If the vehicle bed B is below dock level, the operator pulls chain 343 to lower cam 324 and walks the leveler 12 down until the lip 18 rests on the vehicle bed B and the cam 324 is held in the lowered position until the vehicle V departs.

When the sensor bar 54 loses contact with the bed B, the spring 328 biases the cam 324 towards the raised position as shown in FIG. 20. If the deck 16 is at dock level or higher, the cam 324 will return to the raised position. If the deck 16 is at a partially below-dock level position, the cam 324 will rotate to an intermediate position wherein one of the cam stops 324a will supportably engage the leg 322. Thus, the leg control assembly 320 will support the deck 16 in the event the vehicle inadvertently departs from the loading dock 1 while a load rests upon the deck 16.

The Fifth Embodiment

Figure 22:
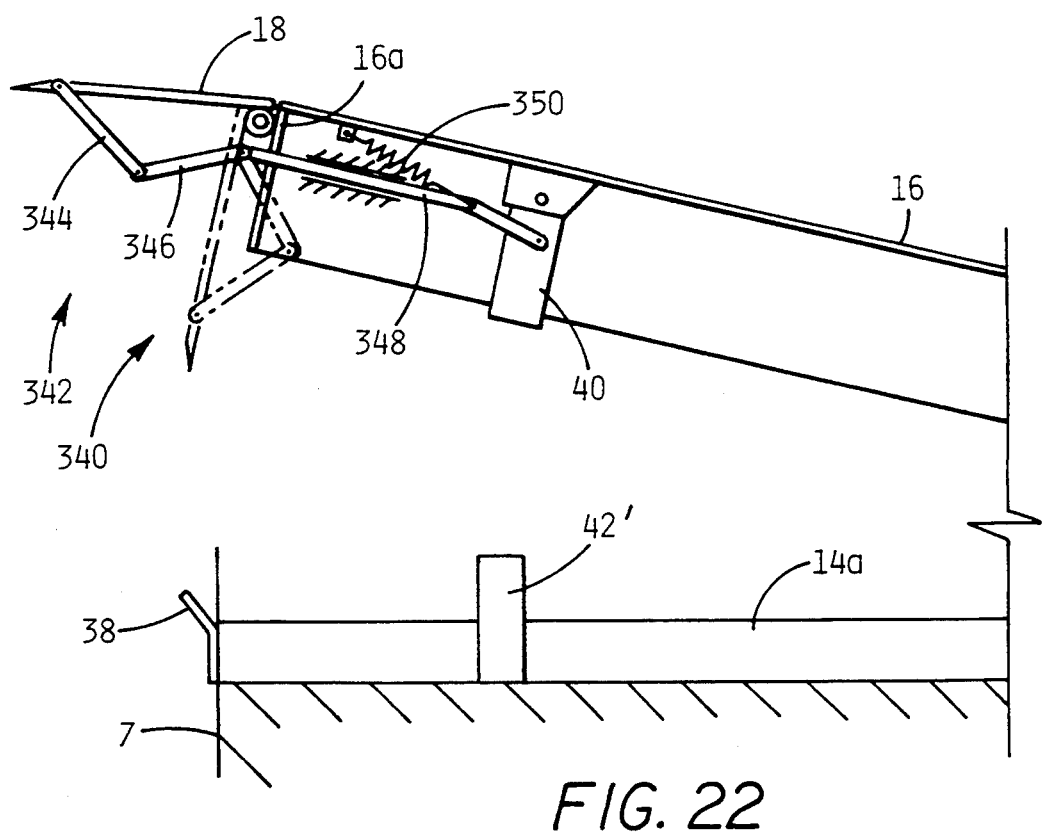
FIG. 22 is a side view of a dock leveler and a fifth embodiment of a vehicle-activated safety leg control assembly in accordance with the invention and illustrates the dock leveler lip in the fully extended preparatory position, the leg control assembly in the preparatory or extended position in solid lines and in the stored position in phantom lines, and the leg in the pendant or supporting position.
Figure 23:
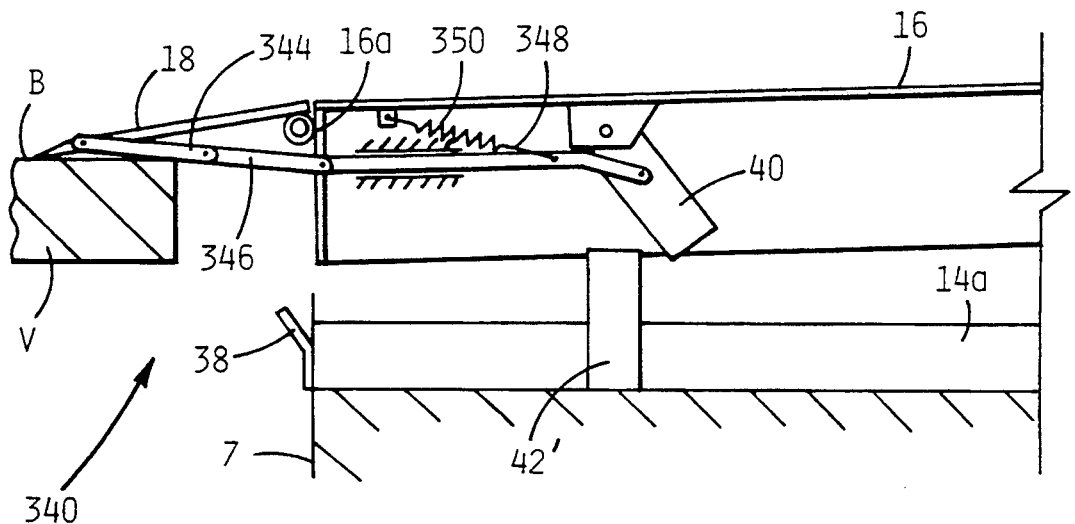
FIG. 23 is a side view of a dock leveler and the fifth embodiment of a vehicle-activated safety leg control assembly of FIG. 22 and illustrates the dock leveler lip engaging the vehicle bed, the control assembly in the compressed position, and the leg in the retracted or non-supporting position.

A fifth embodiment of the safety leg control assembly 340 is illustrated in FIGS. 22–23. A conventional leg linkage assembly 64 may be attached to the legs 40 to provide manual control as previously described. The assembly 64 has not been shown in FIGS. 22–23 in order to simplify the figures.

In the fifth embodiment, the sensor assembly 342 comprises a series of links 344, 346, 348 which are adapted to position the legs 40 between the supporting and non-supporting positions. One end of the first link 344 is pivotally attached to the lip 18 and the other end is pivotally attached to the second link 346. The third link 348 operatively connects the other end of the second link 346 and the leg 40.

When dock leveler 12 is in the initial stored position, the sensor assembly 342 is in a pendant and stored position as illustrated in phantom in FIG. 22. The spring 350 and gravity position the legs 40 to the supporting position.

After vehicle V is parked in the loading dock 1, the dock leveler 12 is actuated to its fully extended position in the normal manner as previously described. The control assembly 340 extends to its preparatory position as illustrated in solid lines in FIG. 22 in response to the extension of the lip 18. The dock leveler 12 is walked down until the lip 18 and the sensor assembly 342 engage the vehicle bed B. When the sensor assembly 342 engages the bed B, the links 344 and 346 pivot to the substantially planar and compressed position shown in FIG. 23, thereby slidably positioning link 348 rearwardly. The rearward movement of the third link 348, in turn, positions the safety leg 40 to the non-supporting position.

When the vehicle V departs the loading dock 1, the sensor assembly 342 loses contact with the bed B before the lip 18. The return spring 350, which is attached between the deck 16 and link 348, biases the leg 40 to the pendant and active supporting position, whereby the leg 40 may engage the stop 42' to prevent downward vertical movement of the deck 16.

The Sixth Embodiment

Figure 24:
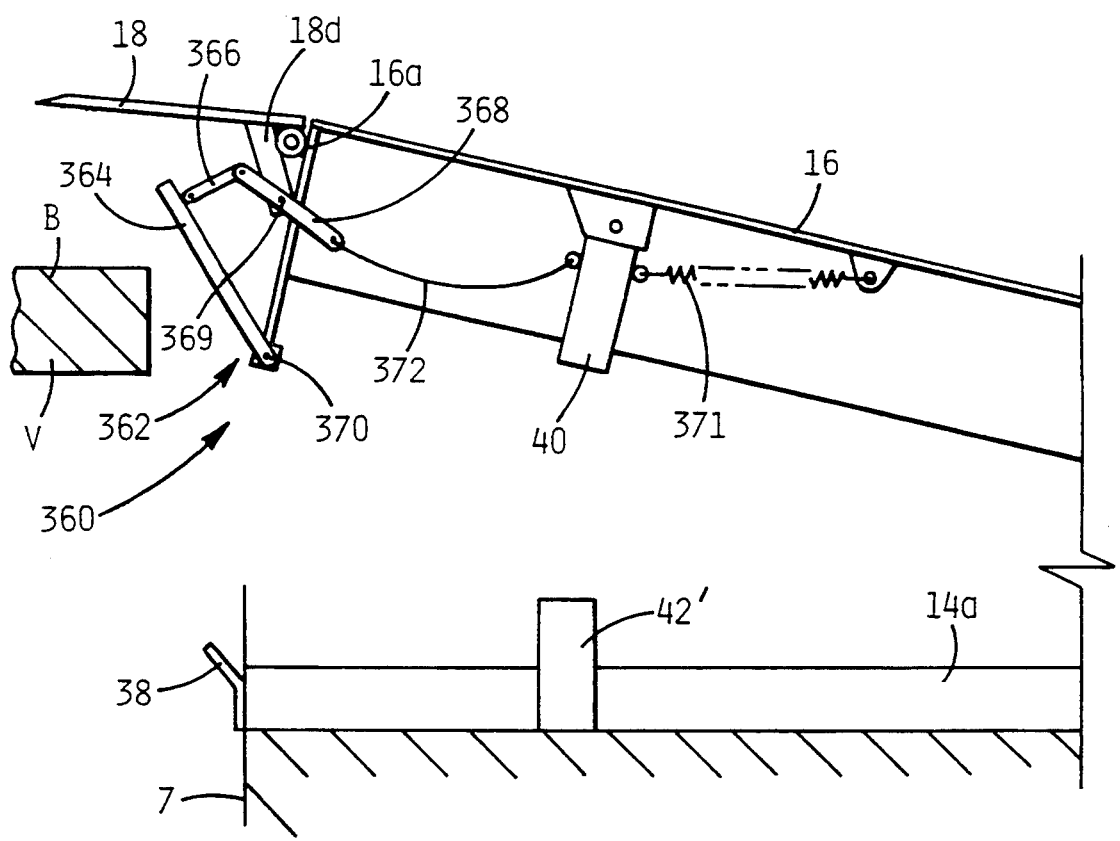
FIG. 24 is a side view of a dock leveler and a sixth embodiment of a vehicle-activated safety leg control assembly in accordance with the invention and illustrates the dock leveler lip in the fully extended preparatory position, the leg control assembly in the fully extended position, and the leg in the pendant or supporting position.
Figure 25:
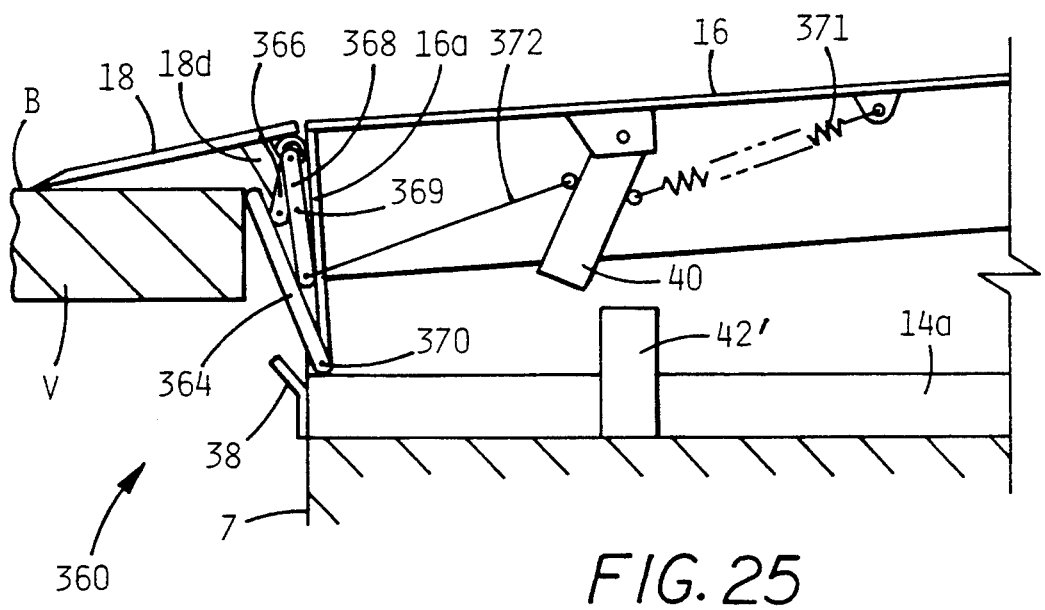
FIG. 25 is a side view of a dock leveler and the sixth embodiment of a vehicle-activated safety leg control assembly of FIG. 24 and illustrates the dock leveler lip engaging the vehicle bed, the control assembly in the compressed position, and the leg in the retracted or non-supporting position.
Figure 26:
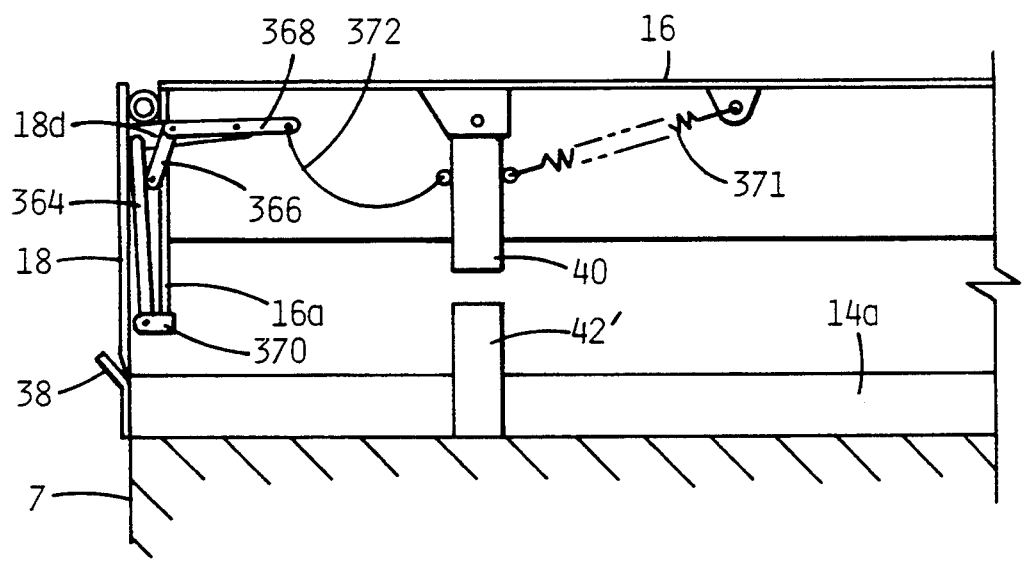
FIG. 26 is a side view of a dock leveler and the sixth embodiment of a vehicle-activated safety leg control assembly of FIG. 24 and illustrates the dock leveler lip and the leg control assembly in the stored position, and the leg in the pendant or supporting position.

A sixth embodiment of the safety leg control assembly 360 is illustrated in FIG. 24–26. The sensor assembly 362 comprises a sensor plate 364 which is pivotally attached to the dock leveler 12. As shown in FIG. 24, the sensor plate 364 is pivotally attached by pin 370 to the deck header 16a for movement between an extended and activated position as shown in FIG. 24 and a stored position as shown in FIG. 26. One end of a first link 366 is pivotally attached to the sensor plate 364 and the other end is pivotally attached to a second link 368. The other end of second link 368 is attached to a chain 372, link or the like which, in turn, is attached to the safety leg 40. Link 368 is attached at a pin 369 to a lug 18d fixedly attached to the lip 18.

When dock leveler 12 is in the initial stored position, the sensor assembly 362 is in a stored position as illustrated in FIG. 26. The spring 371 and gravity position the leg 40 to the supporting position wherein the leg 40 is capable of engaging the safety stop 42'. The lip 18 captures the sensor plate 364 and positions the sensor assembly 362 to the retracted and stored position shown in FIG. 26. The sensor assembly 362 is substantially stored between the lip 18 and the header 16a.

After vehicle V is parked in the loading dock 1, the dock leveler 1 is actuated to its fully extended position in the normal manner as previously described. The extension of the lip 18 permits gravity and a torsion spring (not shown) disposed about pin 370 to extend the sensor plate 364 from the stored position shown in FIG. 26 towards the outwardly extended and activated position shown in FIG. 24. The dock leveler 12 is walked down until the lip 18 engages the vehicle bed B. The presence of the vehicle V compresses the sensor plate 364 and maintains the sensor plate 364 in the compressed position as shown in FIG. 25. The extension of the lip 18 rotates the lug 18d and the link 368 so the compression of the sensor plate 364 upon contact with the vehicle V serves to tighten the chain 372 and pull the leg 40 forwardly to the non-supporting position.

When the vehicle departs the loading dock 1, the sensor assembly 362 loses contact with the vehicle V before the lip 18 loses contact with the bed B. The torsion spring (not shown) and gravity bias the sensor plate 364 to its outwardly extending position as shown in FIG. 24, wherein the tension on the chain 372 is released. The safety leg 40 is returned to its pendant active supporting position by return spring 371 wherein it is capable of engaging the stop 42' and supporting the deck 16.

The Seventh Embodiment

Figure 27:
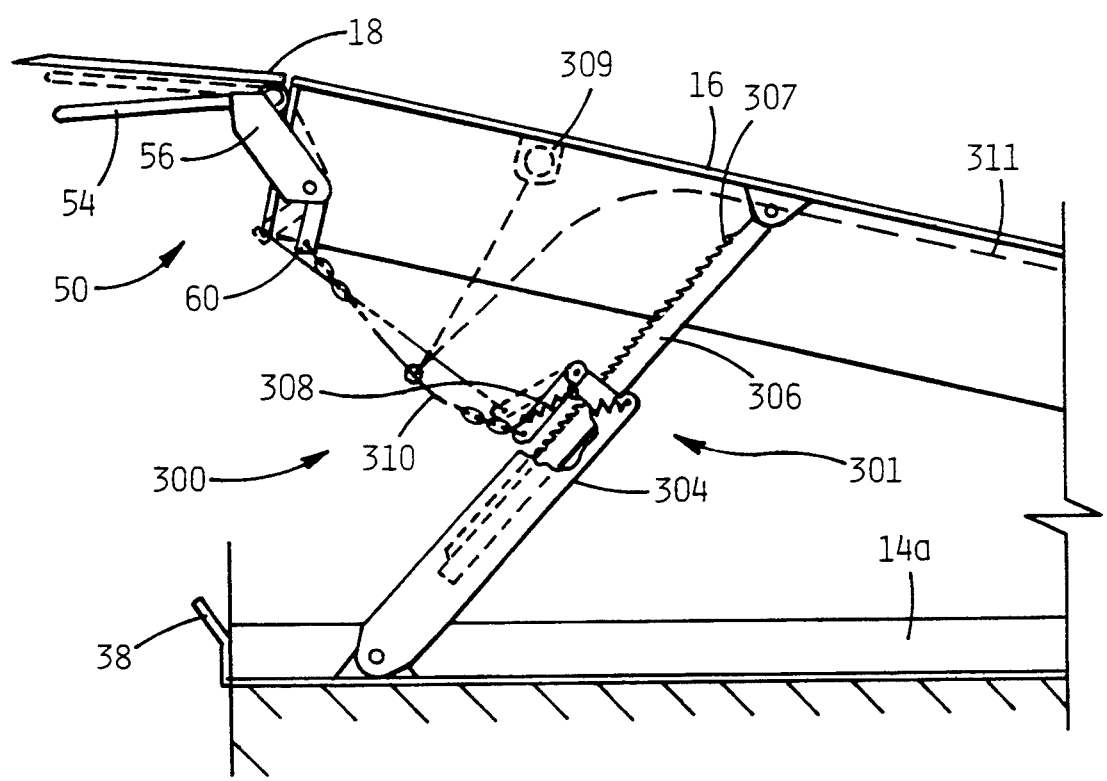
FIG. 27 is a side view of a dock leveler and a seventh embodiment of a vehicle-activated safety leg control assembly in accordance with the invention and illustrates the dock leveler lip in the fully extended preparatory position and the leg control assembly in a preparatory or partially extended position in solid lines and in the activated or engaged position in phantom lines.

A seventh embodiment of the vehicle-activated safety leg control assembly 300 is illustrated in FIG. 27. In the seventh embodiment, the sensor assembly 50 operates in an identical manner to the sensor assembly 50 of the first embodiment.

A support assembly 301 operatively connects the frame floor section 14a and the deck 16 to selectively support and maintain the vertical position of the deck 16 in the event of a premature departure of the vehicle V. The support assembly 301 comprises a lower and upper supports 304, 306 which are adapted to telescopically engage each other to provide variable height adjustment of the deck 16 and a latch 308 which is pivotally mounted to one of the supports for movement between an engaged position when the sensor assembly 50 loses contact with the vehicle V and a disengaged position when the sensor assembly 50 engages the vehicle V. In the engaged position, the latch 308 latchably engages the other of the support to prevent movement between the lower and upper support 304, 306, thereby preventing the vertical movement of the deck 16. In the disengaged position, the latch 308 is disengaged from the other support to permit movement between the lower and upper supports 304, 306 relative to each other, thereby permitting the vertical movement of the deck 16.

In the illustrated embodiment, the upper support 306 has a plurality of teeth 307 which slidably cooperates with the lower support 304. The latch 308 is pivotally mounted on the lower support 304 for selective engagement with the teeth 307 to permit free upward movement of the deck 16 and prevent downward movement of the deck 16. In order to actuate the latch 308, a chain 310, link or the like operatively connects the proximal end of the sensor assembly 50 and the latch 308 so that the latch 308 is positioned between the engaged and disengaged positions in response to the position of the sensor bar 54.

In operation, the dock leveler 12 is initially in the stored position as shown, for example, in FIG. 4 wherein the lip 18 is stored in the keepers 38. After the vehicle V parks adjacent the loading dock 1, the dock leveler 12 is actuated to its extended preparatory position in the normal manner as previously described. The lip 18 is in the extended preparatory position and the sensor bar 54 is in the partially extended position and has not yet engaged the vehicle bed B as shown in solid lines in FIG. 27. The latch 308 engages the teeth 307 so as to prevent movement between the supports 304, 306 and prevent downward movement of the deck 16.

To lower the deck 16, the operator manually pulls the chain 309 or 311 which disengages the latch 308 from the teeth 307 and permits downward vertical movement of the deck 16 until the until the lip 18 and the sensor bar 54 engage the vehicle bed B. In response to engagement between the sensor assembly 50 and the bed B, the sensor assembly 50 pivots to its fully extended position (as shown in phantom lines in FIG. 18) and pulls the chain 310 taut so that the latch 308 is disengaged from the teeth 307, thereby maintaining the latch 308 in the disengaged position. It will be appreciated that the deck 16 will freely float in response to changes in the height of the vehicle bed B.

As the vehicle departs, the sensor bar 54 loses contact with the bed B as best shown in FIG. 7, the latch 308 re-engages the teeth 307 so as to maintain the deck 16 in the vertical position and prevent further vertical movement of the deck 16 before the lip 18 loses contact with the vehicle bed B.

After the vehicle V departs, the lip 18 falls to the pendant position and the dock leveler 12 is returned to the stored position. If the deck 16 is above dock level, the operator manually pulls the chain 309 or 311 which disengages the latch 308 from the teeth 307 and permits downward vertical movement of the deck 16 until the until the lip 18 engages the keepers 38 in the normal manner. If the deck 16 is below-dock level, the deck 16 is rotated to its extended preparatory position and subsequently lowered using chain 309 or 311.

It will be appreciated that the support assembly 301 may also be adapted to perform the functions of both the hold-down assembly 30 and the support legs 40 by adapting the configuration of the latch 308 and the teeth 307 so as to prevent relative movement between the supports 304 and 306 and to prevent upward and downward movement of the deck 16 until the latch 308 is pivoted to the disengaged position by operation of the chain 309 or 311.

Thus, it will be seen that a dock leveler and a vehicle-activated safety leg control system have been provided which attain the aforenoted objects. Various additional modifications of the embodiments of the invention specifically illustrated and described herein will be apparent to those skilled in the art, particularly in light of the teachings of this invention.

We claim as our invention:

1. A dock leveler assembly for loading and unloading vehicles comprising
    a frame mounted relative to a loading dock, a ramp having a front portion and a rear portion pivotally attached to the frame, and lifting means for pivoting the ramp relative to a stored position, a preparatory position, and an operative position for loading and unloading a vehicle, a lip pivotally connected to the front portion of the ramp for pivoting between a downward stored position and extended position wherein the lip may engage a vehicle, and at least one leg adapted to selectively support said ramp,
    a safety leg control assembly comprising a sensor assembly adapted for engaging the vehicle so that the sensor assembly disengages from the vehicle before the lip loses contact with the vehicle as the vehicle moves away from the dock leveler, and
    an actuation assembly operatively connecting the sensor assembly and the leg and adapted for moving the leg from a supporting position to a non-supporting position in response to the engagement of the sensor assembly and the vehicle and from the non-supporting position to the supporting position in response to the effective disengagement of the sensor assembly and the vehicle wherein the legs are positioned such that they will not interfere with the downward movement of the deck in the non-supporting position and wherein the legs are positioned so that they will restrain downward movement of the deck in the supporting position.

2. The assembly as set forth in claim 1 wherein the leg is maintained in the supporting position until the lip engages a bed of the vehicle.

3. The assembly as set forth in claim 1 wherein the leg is maintained in the supporting position until the vehicle is within a predetermined distance from the dock leveler.

4. The assembly as set forth in claim 1 wherein the sensor assembly is adapted to sense the position of a bed of the vehicle relative to the lip.

5. The assembly as set forth in claim 4 wherein the sensor assembly comprises a sensor bar mounted on the dock leveler for engaging the vehicle bed and adapted to lose contact with the vehicle bed before the lip.

6. The assembly as set forth in claim 5 wherein the sensor bar is mounted adjacent one of the edges of the lip.

7. The assembly as set forth in claim 5 wherein the sensor bar is pivotally mounted to the lip.

8. The assembly as set forth in claim 5 wherein the sensor bar is pivotally mounted to the deck.

9. The assembly as set forth in claim 5 wherein the sensor bar is pivotally mounted to a deck header disposed at the front portion of the ramp.

10. The assembly as set forth in claim 4 wherein the sensor bar is disposed below the lip so as to engage the vehicle before the lip.

11. The assembly as set forth in claim 4 wherein the sensor bar has a shorter length than the lip so that the sensor bar loses contact with the bed before the lip in response to the departing vehicle.

12. The assembly as set forth in claim 1 wherein the sensor assembly comprises a sensor bar pivotally attached to the deck for movement between a pendant position for storage, a partially extended position for engaging the bed, and a fully extended position, wherein the legs are positioned in the supporting position for supporting the deck when the sensor bar is in the partially extended position.

13. The assembly as set forth in claim 12 wherein the legs are positioned in the non-supporting position when the sensor bar is in the fully extended position.

14. The assembly as set forth in claim 12 wherein the legs are positioned in the supporting position for supporting the deck when the sensor bar is in the pendant position.

15. The assembly as set forth in claim 12 wherein the actuation assembly comprises a linkage assembly operatively connecting the sensor assembly and the legs such that the linkage assembly rotates in response to the rotation of the sensor bar so as to pivot the legs between the supporting and non-supporting positions.

16. The assembly as set forth in claim 12 wherein the sensor bar is yieldably mounted to avoid damage in response to rearward impact by the incoming vehicle.

17. The assembly as set forth in claim 1 wherein the leg is operatively connected to a manually operated chain assembly for movement between the supporting and non-supporting positions.

18. The assembly as set forth in claim 1 wherein the sensor assembly comprises a sensor plate adapted for movement between extended and compressed positions in response to the movement of the vehicle, wherein the leg is positioned in the supported position for supporting the deck when the sensor plate is in the extended position and wherein the leg is positioned in the non-supporting position when the sensor plate is in the compressed position.

19. The assembly as set forth in claim 1 wherein the sensor assembly comprises a sensor plate adapted to lose contact with the rear edge of the vehicle before the lip loses contact with the vehicle bed.

20. The assembly as set forth in claim 19 wherein the extended position of the sensor plate has a shorter length than the lip so that the sensor plate loses contact with the rear edge of the vehicle before the lip loses contact with the bed in response to the departing vehicle.

21. A safety leg control assembly for use in a dock leveler system wherein the dock leveler system is provided with a frame mounted to a loading dock, a ramp having a front portion and a rear portion hingedly attached to the frame, and lifting means for moving the ramp between a stored position, a preparatory position, and an operative position for loading and unloading a vehicle, and a lip hingedly connected to the front portion of the ramp for pivoting between a stored position and an extended position, and at least one leg adapted to selectively support said ramp, the leg control assembly comprising:
a sensor assembly adapted for engaging the rearward edge of the vehicle so that the sensor assembly disengages from the vehicle before the lip loses contact with the vehicle as the vehicle moves away from the dock leveler, and
an actuation assembly operatively connecting the sensor assembly and the leg for moving the leg from a supporting position to a non-supporting position in response to engagement of the sensor assembly and the truck and the movement of the vehicle towards the loading dock wherein the leg is positioned such that it will not interfere with the downward movement of the deck and from a non-supporting position to the supporting position in response to the movement of the vehicle away from the loading dock wherein the leg is positioned so that it will restrain downward movement of the deck.

22. The assembly as set forth in claim 21 wherein the leg is maintained in the supporting position until the vehicle is within a predetermined distance from the dock leveler so that the lip may engage a bed of the vehicle.

23. The assembly as set forth in claim 21 wherein the sensor assembly is adapted to sense the position of a bed of the vehicle relative to the lip.

24. The assembly as set forth in claim 21 wherein the sensor assembly comprises a sensor plate adapted for movement between extended and compressed positions in response to the movement of the vehicle, wherein the leg is positioned in the supporting position for supporting the deck when the sensor plate is in the extended position and wherein the leg is positioned in the non-supporting position when the sensor plate is in the compressed position.

25. The assembly as set forth in claim 24 wherein the sensor plate is hingedly attached to the dock about a vertically extending axis.

26. The assembly as set forth in claim 24 wherein the sensor plate is hingedly attached to the dock about a horizontally extending axis.

27. The assembly as set forth in claim 24 wherein the sensor plate is slidably attached to the dock.

28. The assembly as set forth in claim 24 wherein the sensor plate is hingedly attached to a deck header disposed at the front portion of the ramp.

29. The assembly as set forth in claim 26 wherein the actuation assembly comprises a linkage assembly attached to the sensor plate and a chain operatively connecting the linkage assembly and the leg such that movement of the sensor plate towards the compressed positions causes the linkage assembly and chain to position the leg to the non-supporting position.

30. The assembly as set forth in claim 29 wherein a spring operatively connects the leg to position the leg to the supporting position when the sensor plate is in the extended position.

31. The assembly as set forth in claim 21 wherein the sensor assembly comprises a sensor plate adapted to lose contact with the rear edge of the vehicle before the lip loses contact with a bed of the vehicle.

32. The assembly as set forth in claim 31 wherein the extended position of the sensor plate has a shorter length than the lip so that the sensor plate loses contact with the rear edge of the vehicle before the lip loses contact with the bed in response to the departing vehicle.

33. The assembly as set forth in claim 21 wherein the actuation assembly has a cam surface adapted to guide the legs between the non-supporting and supporting positions.

34. The assembly as set forth in claim 21 wherein the actuation assembly comprises a leg deflector and a link operatively connecting the sensor plate and the leg deflector plate such that the link moves inwardly in response to the inward movement of the sensor plate so as to raise the leg deflector and the link moves outwardly in response to the outward movement of the sensor plate so as to lower the leg deflector plate and wherein the leg deflector plate guides the leg between the non-supporting and supporting positions when it is in the raised and lowered positions, respectively.

35. A safety leg control assembly for use in a dock leveler system wherein the dock leveler system is provided with a frame mounted to a loading dock, a ramp having a front portion and a rear portion hingedly attached to the frame, and lifting means for moving the ramp between a stored position, a preparatory position, and an operative position for loading and unloading a vehicle, a lip hingedly connected to the front portion of the ramp for pivoting between a stored position and an extended position, and at least one leg adapted to selectively support said ramp, the leg control assembly comprising:
a sensor assembly mounted to the dock leveler and adapted for engaging the vehicle so that the sensor assembly disengages from the vehicle before the lip loses contact with the vehicle as the vehicle moves away from the dock leveler, and a stop assembly operatively connected to the sensor assembly having a plurality of stop positions for engaging the leg, wherein the stop assembly is adapted for moving between a deactivated position in response to the engagement of the sensor assembly and the vehicle and an activated position in response to disengagement of the sensor assembly and the vehicle, wherein the stop assembly is positioned such that it will be disengaged from the leg and will not interfere with the downward movement of the deck in the deactivated position and wherein the stop assembly is positioned so that it will engage the leg and restrain downward movement of the deck in the activated position.

36. The assembly as set forth in claim 35 wherein the stop assembly is mounted on the floor and the leg is mounted on the underside of the deck.

37. The assembly as set forth in claim 36 wherein the stop assembly is mounted on the underside of the deck and the leg is mounted on the floor.

38. The assembly as set forth in claim 35 wherein a spring biases the stop assembly to the activated position.

39. The assembly as set forth in claim 38 wherein an actuation assembly operatively connecting the stop assembly and the sensor assembly positions the stop assembly to the deactivated position in response to engagement between the sensor assembly and the vehicle.

40. A dock leveler assembly for loading and unloading a vehicle comprising
a frame mounted to a loading dock, a ramp having a front portion and a rear portion hingedly attached to the frame, and lifting means for moving the ramp between a stored position, a preparatory position, and an operative position for loading and unloading a vehicle, and a lip hingedly connected to the front portion of the ramp for pivoting between a pendant position and an extended position, a control assembly comprising a sensor assembly and a support assembly, the sensor assembly adapted for engaging the vehicle so that the sensor assembly disengages from the vehicle before the lip loses contact with the vehicle as the vehicle moves away from the dock leveler, the support assembly operatively connecting the ramp to selectively support and maintain the vertical position of the ramp, the support assembly comprising a latch and lower and upper supports which are adapted to engage each other to provide variable height adjustment of the ramp, the latch operatively connected to the sensor assembly and mounted to one of the lower and upper supports for movement between an engaged position in which the latch engages the other of the lower and upper supports when the sensor assembly does not engage the vehicle to prevent movement between the lower and upper support and vertical movement of the ramp and a disengaged position in which the latch does not engage the other of the lower and upper supports in response to engagement between the sensor assembly and the vehicle to permit movemnt between the lowerand upper supports relative to each other and vertical movment of the ramp.

41. The assembly as set forth in claim 40 wherein the upper support has a plurality of teeth and the latch is pivotally mounted on the lower support for selective engagement with the teeth to permit free upward movement of the deck and prevent downward movement of the deck.

42. The assembly as set forth in claim 41 wherein the latch is connected to the sensor assembly.

43. A dock leveler assembly for loading and unloading vehicles comprising a frame mounted relative to a loading dock, a ramp having a front portion and a rear portion pivotally attached to the frame, and lifting means for pivoting the ramp relative to a stored position, a preparatory position, and an operative position for loading and unloading a vehicle, a lip pivotally connected to the front edge of the ramp for pivoting between a downward stored position and extended positions wherein the lip may engage a vehicle, and at least one leg positoned between said frame and said ramp, a safety leg control assembly comprising a sensor assembly adapted for engaging the vehicle so that the sensor assembly disengages from the vehicle before the lip loses contact with the vehicle as the vehicle moves away from the dock leveler, and an actuation assembly operatively connecting the sensor assembly and the leg and adapted for moving the leg from a supporting position to a non-supporting position in response to engagement of the sensor assembly and the vehicle and from a non-supporting position to the supporting position prior to the effective disengagement of the lip and the vehicle, wherein the legs are positioned such that they will not interfere with the downward movement of the deck in the non-supporting position and wherein the legs are positioned so that they will restrain downward movment of the deck in the supporting position.

44. A dock leveler assembly for loading and unloading a vehicle comprising:

a frame mounted to a loading dock, a ramp having a front portion and a rear portion hingedly attached to the frame, and lifting means for moving the ramp between a stored position, a preparatory position, and an operative position for loading and unloading a vehicle, and a lip hingedly connected to the front portion of the ramp for pivoting between a stored position and an extended position, and a control assembly comprising a support assembly which may be positioned between an engaged position to selectively support and maintain the vertical position of the ramp when the lip does not engage the vehicle and a disengaged position in which the support assembly will not interfere with the vertical movement of the ramp, and a sensor assembly adapted for engaging the vehicle so that the sensor assembly disengages from the vehicle before the lip loses contact with the vehicle as the vehicle moves away from the dock leveler, the sensor assembly being operatively attached to the support assembly for positioning the support assembly from the engaged position when the sensor assembly does not engage the vehicle to the disengaged position after the sensor assembly engages the vehicle.

45. The assembly as set forth in claim 44 wherein the support assembly comprises lower and upper supports adapted to engage each other to provide variable height adjustment of the deck.

46. A dock leveler assembly for loading and unloading vehicles comprising a frame mounted relative to a loading dock, a ramp having a front portion and a rear portion pivotally attached to the frame, and lifting means for pivoting the ramp relative to a stored position, a preparatory position, and an operative position for loading and unloading a vehicle, a lip pivotally connected to the front portion of the ramp for pivoting between a downward stored position and extended position wherein the lip may engage a vehicle, and at least one leg adapted to selectively support said ramp which is maintained in the supporting position until the lip engages a bed of the vehicle, a safety leg control assembly comprising a sensor assembly adapted for engaging the vehicle so that the sensor assembly disengages from the vehicle before the lip loses contact with the vehicle as the vehicle moves away from the dock leveler, and an actuation assembly operatively connecting the sensor assembly and the leg and adapted for moving the leg between a non-supporting position in response to the engagement of the sensor assembly and the vehicle and a supporting position in response to the effective disengagement of the sensor assembly and the vehicle wherein the legs are positioned such that they will not interfere with the downward movement of the deck in the non-supporting position and wherein the legs are positioned so that they will restrain downward movement of the deck in the supporting position.

47. A dock leveler assembly for loading and unloading a vehicle comprising: a frame mounted to a loading dock, a ramp having a front portion and a rear portion hingedly attached to the frame, and lifting means for moving the ramp between a stored position, a preparatory position, and an operative position for loading and unloading a vehicle, and a lip hingedly connected to the front portion of the ramp for pivoting between a stored position and an extended position, and a control assembly comprising a support assembly which may be positioned between an engaged position to selectively support and maintain the vertical position of the ramp when the lip does not engage the vehicle and a disengaged position in which the support assembly will not interfere with the vertical movement of the ramp, and a sensor assembly adapted for engaging the vehicle so that the sensor assembly disengages from the vehicle before the lip loses contact with the vehicle as the vehicle moves away from the dock leveler, the sensor assembly being operatively attached to the support assembly for positioning the support assembly between the engaged position when the sensor assembly does not engage the vehicle and the disengaged position when the sensor assembly engages the vehicle, and wherein the support assembly comprises lower and upper supports adapted to engage each other to provide variable height adjustment of the deck.

* * * * *